United States Patent [19]

Tsuruta

[11] Patent Number: 5,206,827

[45] Date of Patent: Apr. 27, 1993

[54] ITERATIVE HIGH RADIX DIVIDER DECODING THE UPPER BITS OF A DIVISOR AND DIVIDEND

[75] Inventor: Hideyo Tsuruta, Hirakata, Japan

[73] Assignee: Matsushita Electric Co., Ltd., Osaka, Japan

[21] Appl. No.: 682,902

[22] Filed: Apr. 9, 1991

[30] Foreign Application Priority Data

Apr. 10, 1990 [JP] Japan .................................. 2-95759
Apr. 4, 1991 [JP] Japan .................................. 3-071405

[51] Int. Cl.$^5$ ................................................ G06F 7/52
[52] U.S. Cl. .................................................. 364/767
[58] Field of Search ...................................... 364/767

[56] References Cited

U.S. PATENT DOCUMENTS 3,733,477 5/1973 Tate et al. ............................ 364/767
3,852,581 12/1974 Reynard et al. ...................... 364/767
4,722,069 1/1988 Ikeda et al. .......................... 364/767

OTHER PUBLICATIONS

Jackson et al., "Binary Multiplication and Division Utilizing a Three-Input Adder" *IBM Tech. Disclosure Bulletin* vol. 15 No. 7 Dec. 1992 pp. 2263-2268.
A partial Japanese translation of Kai Hawng, "Computer Arithmetic/Principles, Architecture, and Design", John Wiley & Sons, 1979 (Ch. 7, sec. 9-11).
D. E. Atkins, "Higher Radix Division Using Estimates of the Divisor and Partial Remainders", IEEE Trans. Computers, vol. C-17, No. 10, pp. 925-934, Oct. 1986.
D. E. Atkins, "Design of the Arithmetic Units of IL-LIAC III: Use of Redundancy and Higher Radix Methods" IEEE Trans. Computers, vol. C-19, No. 8, pp. 720-732.

*Primary Examiner*—David H. Malzahn
*Attorney, Agent, or Firm*—Price, Gess & Ubell

[57] ABSTRACT

A divider unit is provided for a high-radix division using a partial remainder. A quotient digit selecting device selects one from all quotient digits obtainable under an applied radix based on the signs and the upper digit values of the divisor and the partial remainder represented in the two's complement representation or, alternatively, on the upper digit values of the divisor and the partial remainder represented in the redundant binary representation. A number of divisor's multiple generating devices each generate at least one of 0 and a value obtained by multiplying the divisor with $2^j$ (j=integer). At least one adding and subtracting device provides at least three inputs to generate a first product corresponding to any desired multiple of the divisor by adding or subtracting the outputs from the multiple generating devices and to generate another partial remainder by adding or subtracting the first product with a second product corresponding to a value obtained by multiplying the partial remainder by the radix.

45 Claims, 36 Drawing Sheets

FIG. 1

| DIVISOR INTERVAL | LOGICAL EXPRESSION | RANGE OF DIVISOR d |
|---|---|---|
| $D_1$ | $\overline{M_2}\,\overline{M_3}\,\overline{M_4}$ | $8/16 \leq d < 9/16$ |
| $D_2$ | $\overline{M_2}\,\overline{M_3}\,M_4$ | $9/16 \leq d < 10/16$ |
| $D_3$ | $\overline{M_2}\,M_3\,\overline{M_4}$ | $10/16 \leq d < 11/16$ |
| $D_4$ | $\overline{M_2}\,M_3\,M_4$ | $11/16 \leq d < 12/16$ |
| $D_5$ | $M_2\,\overline{M_3}$ | $12/16 \leq d < 14/16$ |
| $D_6$ | $M_2\,M_3$ | $14/16 \leq d < 16/16$ |
| $D_7$ | $D_1 + D_2 + D_3$ | $8/16 \leq d < 11/16$ |
| $D_8$ | $D_4 + D_5 + D_6$ | $11/16 \leq d < 16/16$ |
| $D_9$ | $D_4 + D_5$ | $11/16 \leq d < 14/16$ |
| $D_{10}$ | $D_5 + D_6 (= M_2)$ | $12/16 \leq d < 16/16$ |
| $D_{11}$ | $D_1 + D_2 + D_3 + D_4 (=\overline{M_2})$ | $8/16 \leq d < 12/16$ |

FIG. 2

| QUOTIENT | LOGICAL EXPRESSION | LOGICAL EXPRESSION FOR QUOTIENT DIGIT SELECTION |
|---|---|---|
| 0 | ZERO P | $\bar{A}_0 \bar{A}_1 \bar{A}_2 \bar{A}_3 \bar{A}_4 + \bar{A}_0 \bar{A}_1 \bar{A}_2 \bar{A}_3 A_4 \bar{A}_5 D_1 + \bar{A}_0 \bar{A}_1 \bar{A}_2 \bar{A}_3 D_{10}$ |
| $\bar{0}$ | ZERO N | $A_0 \bar{A}_1 A_2 A_3 A_4 + A_0 \bar{A}_1 A_2 A_3 \bar{A}_4 A_5 D_{10}$ |
| 2 | TWO P | $\bar{A}_0 \bar{A}_3 A_4 \bar{A}_5 \bar{A}_6 D_1 + \bar{A}_0 A_3 A_4 A_5 A_5 D_1 + \bar{A}_0 A_3 A_4 A_4 A_5 A_6 D_2 + \bar{A}_0 A_2 A_3 D_8 + \bar{A}_0 A_2 \bar{A}_3 A_4 D_9 +$ $\bar{A}_0 \bar{A}_2 \bar{A}_3 \bar{A}_4 A_5 \bar{A}_4 A_5 D_4 + \bar{A}_0 \bar{A}_2 \bar{A}_3 \bar{A}_4 A_5 A_6 D_6 + \bar{A}_0 A_1 + \bar{A}_0 A_2 D_7$ |
| $\bar{2}$ | TWO N | $A_0 \bar{A}_3 \bar{A}_4 D_1 + A_0 \bar{A}_3 \bar{A}_4 \bar{A}_5 D_2 + A_0 \bar{A}_3 \bar{A}_4 \bar{A}_5 \bar{A}_6 D_3 + A_0 \bar{A}_2 \bar{A}_3 \bar{A}_4 \bar{A}_5 \bar{A}_6 D_5 + A_0 \bar{A}_2 \bar{A}_3 \bar{A}_4 \bar{A}_5 \bar{A}_6 +$ $A_0 \bar{A}_2 D_{11} + A_0 \bar{A}_2 \bar{A}_3 \bar{A}_4 D_5 + A_0 \bar{A}_2 \bar{A}_3 + A_0 \bar{A}_1$ |
| 1 | ONE P | $\overline{\text{zeroP} + \text{zeroN} + \text{twoP} + \text{twoN} \cdot \bar{A}_0}$ |
| $\bar{1}$ | ONE N | $\overline{\text{zeroP} + \text{zeroN} + \text{twoP} + \text{twoN} \cdot A_0}$ |

Fig. 4

|  | BIT ALLOCATION |
|---|---|
| 1 | 01 |
| 0 | X0 |
| $\bar{1}$ | 11 |

FIG. 5

| PARTIAL REMAINDER INTERVAL | LOGICAL EXPRESSION | VALUE OF $r_0^{(j)}, r_1^{(j)}, r_2^{(j)}, r_3^{(j)}$ IN TWO'S COMPLEMENT REPRESENTATION | RANGE OF $R^{(j)}$ | |
|---|---|---|---|---|
| | | | BINARY NOTATION | DECIMAL NOTATION |
| $R_4$ | $\overline{r_0} r_1$ | 0.1XX | $0.100 \leq R^{(j)} < 1.000$ | $4/8 \leq R^{(j)} < 8/8$ |
| $R_3$ | $\overline{r_0}\overline{r_1} r_2 r_3$ | 0.011 | $0.011 \leq R^{(j)} < 0.100$ | $3/8 \leq R^{(j)} < 4/8$ |
| $R_2$ | $\overline{r_0}\overline{r_1} r_2 \overline{r_3}$ | 0.010 | $0.010 \leq R^{(j)} < 0.011$ | $2/8 \leq R^{(j)} < 3/8$ |
| $R_1$ | $\overline{r_0}\overline{r_1}\overline{r_2} r_3$ | 0.001 | $0.001 \leq R^{(j)} < 0.010$ | $1/8 \leq R^{(j)} < 2/8$ |
| $R_0$ | $\overline{r_0}\overline{r_1}\overline{r_2}\overline{r_3}$ | 0.000 | $0.000 \leq R^{(j)} < 0.001$ | $0/8 \leq R^{(j)} < 1/8$ |
| $R_{\overline{0}}$ | $r_0 \overline{r_1} r_2 r_3$ | 1.111 | $-0.001 \leq R^{(j)} < -0.000$ | $-1/8 \leq R^{(j)} < -0/8$ |
| $R_{\overline{1}}$ | $r_0 \overline{r_1} r_2 \overline{r_3}$ | 1.110 | $-0.010 \leq R^{(j)} < -0.001$ | $-2/8 \leq R^{(j)} < -1/8$ |
| $R_{\overline{2}}$ | $r_0 \overline{r_1}\overline{r_2} r_3$ | 1.101 | $-0.011 \leq R^{(j)} < -0.010$ | $-3/8 \leq R^{(j)} < -2/8$ |
| $R_{\overline{3}}$ | $r_0 \overline{r_1}\overline{r_2}\overline{r_3}$ | 1.100 | $-0.100 \leq R^{(j)} < -0.011$ | $-4/8 \leq R^{(j)} < -3/8$ |
| $R_{\overline{4}}$ | $r_0 \overline{r_1}$ | 1.0XX | $-1.000 \leq R^{(j)} < -0.100$ | $-8/8 \leq R^{(j)} < -4/8$ |

FIG. 6

| PARTIAL REMAINDER INTERVAL | $q_j = 3$ | | $q_j = 2$ | | $q_j = 1$ | | $q_j = 0$ | |
|---|---|---|---|---|---|---|---|---|
| | $D_{min}$ | $D_{max}$ | $D_{min}$ | $D_{max}$ | $D_{min}$ | $D_{max}$ | $D_{min}$ | $D_{max}$ |
| $R_4$ | 2/4 (—) | 4/4 (4/4) | | | | | | |
| $R_3$ | 2/4 (4/8) | 3/4 (3/4) | 3/4 (4/6) | 4/4 (3/2) | | | | |
| $R_2$ | | | 2/4 (3/6) | 4/4 (2/2) | | | | |
| $R_1$ | | | | | 2/4 (2/4) | 4/4 (—) | | |
| $R_0$ | | | | | | | 2/4 (—) | 4/4 (—) |

RANGE OF DIVISOR D

FIG. 7

| PARTIAL REMAINDER | VALUE OF QUOTIENT DIGIT $q_j$ | DIVISOR INTERAL | RANGE OF DIVISOR D | LOGICAL EXPRESSION |
|---|---|---|---|---|
| $R_0$ | 0 | $D_0(0)$ | $2/4 \leq D < 4/4$ | ALWAYS 1 |
| $R_1$ | 1 | $D_1(1)$ | $2/4 \leq D < 4/4$ | ALWAYS 1 |
| $R_2$ | 2 | $D_2(2)$ | $2/4 \leq D < 4/4$ | ALWAYS 1 |
| $R_3$ | 2 | $D_3(2)$ | $3/4 \leq D < 4/4$ | $d_2$ |
| $R_3$ | 3 | $D_3(3)$ | $2/4 \leq D < 3/4$ | $\bar{d}_2$ |
| $R_4$ | 3 | $D_4(3)$ | $2/4 \leq D < 4/4$ | ALWAYS 1 |

FIG. 11

| VALUE OF QUOTIENT DIGIT $q_j$ | A: OUTPUT FROM THE CIRCUIT 33 | B: OUTPUT FROM THE CIRCUIT 34 | OPERATION BY THE CIRCUIT 37 TO OBTAIN $R^{(j+2)}$ |
|---|---|---|---|
| -3 | 2D | D | $4R^{(j)} + A + B$ |
| -2 | 2D | '0' | $4R^{(j)} + A + B(4R^{(j)} + A \pm B)$ |
| -1 | '0' | D | $4R^{(j)} + A + B(4R^{(j)} \pm A + B)$ |
| 0 | '0' | '0' | $4R^{(j)} + A + B(4R^{(j)} \pm A \pm B)$ |
| 1 | '0' | D | $4R^{(j)} - A - B(4R^{(j)} \pm A - B)$ |
| 2 | 2D | '0' | $4R^{(j)} - A - B(4R^{(j)} - A \pm B)$ |
| 3 | 2D | D | $4R^{(j)} - A - B$ |

Fig. 12a

| PARTIAL REMAINDER INTERVAL | LOGICAL EXPRESSION | VALUE OF $r_0^{(j)} r_1^{(j)} r_2^{(j)} r_3^{(j)} r_4^{(j)} r_5^{(j)}$ IN 2'S COMP. REPRESENTATION | RANGE OF $R^{(j)}$ | |
|---|---|---|---|---|
| | | | BINARY NOTATION | DECIMAL NOTATION |
| $R_{27}$ | $\bar{r}_0 r_1 r_2 r_3$ | 0.111XX | $0.11000 < R^{(j)} < 1.00000$ | $24/32 < R^{(j)} < 32/32$ |
| $R_{26}$ | $\bar{r}_0 r_1 r_2 \bar{r}_3 r_4$ | 0.1101X | $0.11000 < R^{(j)} < 0.11100$ | $24/32 < R^{(j)} < 28/32$ |
| $R_{25}$ | $\bar{r}_0 r_1 r_2 \bar{r}_3 r_4 \bar{r}_5$ | 0.11001 | $0.11000 < R^{(j)} < 0.11010$ | $24/32 < R^{(j)} < 26/32$ |
| $R_{24}$ | $\bar{r}_0 r_1 r_2 \bar{r}_3 \bar{r}_4 \bar{r}_5$ | 0.11000 | $0.10111 < R^{(j)} < 0.11001$ | $23/32 < R^{(j)} < 25/32$ |
| $R_{23}$ | $\bar{r}_0 r_1 \bar{r}_2 r_3 r_4 r_5$ | 0.10111 | $0.10110 < R^{(j)} < 0.11000$ | $22/32 < R^{(j)} < 24/32$ |
| $R_{22}$ | $\bar{r}_0 r_1 \bar{r}_2 r_3 r_4 \bar{r}_5$ | 0.10110 | $0.10101 < R^{(j)} < 0.10111$ | $21/32 < R^{(j)} < 23/32$ |
| $R_{21}$ | $\bar{r}_0 r_1 \bar{r}_2 r_3 \bar{r}_4 r_5$ | 0.10101 | $0.10100 < R^{(j)} < 0.10110$ | $20/32 < R^{(j)} < 22/32$ |
| $R_{20}$ | $\bar{r}_0 r_1 \bar{r}_2 r_3 \bar{r}_4 \bar{r}_5$ | 0.10100 | $0.10011 < R^{(j)} < 0.10101$ | $19/32 < R^{(j)} < 21/32$ |
| $R_{19}$ | $\bar{r}_0 r_1 \bar{r}_2 \bar{r}_3 r_4 r_5$ | 0.10011 | $0.10010 < R^{(j)} < 0.10100$ | $18/32 < R^{(j)} < 20/32$ |
| $R_{18}$ | $\bar{r}_0 r_1 \bar{r}_2 \bar{r}_3 r_4 \bar{r}_5$ | 0.10010 | $0.10001 < R^{(j)} < 0.10011$ | $17/32 < R^{(j)} < 19/32$ |
| $R_{17}$ | $\bar{r}_0 r_1 \bar{r}_2 \bar{r}_3 \bar{r}_4 r_5$ | 0.10001 | $0.10000 < R^{(j)} < 0.10010$ | $16/32 < R^{(j)} < 18/32$ |

Fig. 12b

| | | | |
|---|---|---|---|
| $R_{16}$ | $\bar{r}_0 r_1 \bar{r}_2 \bar{r}_3 \bar{r}_4 \bar{r}_5$ | 0.10000 | $15/32 < R^{(j)} < 17/32$ |
| $R_{15}$ | $\bar{r}_0 \bar{r}_1 r_2 r_3 r_4 r_5$ | 0.01111 | $14/32 < R^{(j)} < 16/32$ |
| $R_{14}$ | $\bar{r}_0 \bar{r}_1 r_2 r_3 r_4 \bar{r}_5$ | 0.01110 | $13/32 < R^{(j)} < 15/32$ |
| $R_{13}$ | $\bar{r}_0 \bar{r}_1 r_2 r_3 \bar{r}_4 r_5$ | 0.01101 | $12/32 < R^{(j)} < 14/32$ |
| $R_{12}$ | $\bar{r}_0 \bar{r}_1 r_2 r_3 \bar{r}_4 \bar{r}_5$ | 0.01100 | $11/32 < R^{(j)} < 13/32$ |
| $R_{11}$ | $\bar{r}_0 \bar{r}_1 r_2 \bar{r}_3 r_4 r_5$ | 0.01011 | $10/32 < R^{(j)} < 12/32$ |
| $R_{10}$ | $\bar{r}_0 \bar{r}_1 r_2 \bar{r}_3 r_4 \bar{r}_5$ | 0.01010 | $9/32 < R^{(j)} < 11/32$ |
| $R_9$ | $\bar{r}_0 \bar{r}_1 r_2 \bar{r}_3 \bar{r}_4 r_5$ | 0.01001 | $8/32 < R^{(j)} < 10/32$ |
| $R_8$ | $\bar{r}_0 \bar{r}_1 r_2 \bar{r}_3 \bar{r}_4 \bar{r}_5$ | 0.01000 | $7/32 < R^{(j)} < 9/32$ |
| $R_7$ | $\bar{r}_0 \bar{r}_1 \bar{r}_2 r_3 r_4 r_5$ | 0.00111 | $6/32 < R^{(j)} < 8/32$ |
| $R_6$ | $\bar{r}_0 \bar{r}_1 \bar{r}_2 r_3 r_4 \bar{r}_5$ | 0.00110 | $5/32 < R^{(j)} < 7/32$ |
| $R_5$ | $\bar{r}_0 \bar{r}_1 \bar{r}_2 r_3 \bar{r}_4 r_5$ | 0.00101 | $4/32 < R^{(j)} < 6/32$ |
| $R_4$ | $\bar{r}_0 \bar{r}_1 \bar{r}_2 r_3 \bar{r}_4 \bar{r}_5$ | 0.00100 | $3/32 < R^{(j)} < 5/32$ |
| $R_3$ | $\bar{r}_0 \bar{r}_1 \bar{r}_2 \bar{r}_3 r_4 r_5$ | 0.00011 | $2/32 < R^{(j)} < 4/32$ |
| $R_2$ | $\bar{r}_0 \bar{r}_1 \bar{r}_2 \bar{r}_3 r_4 \bar{r}_5$ | 0.00010 | $1/32 < R^{(j)} < 3/32$ |
| $R_1$ | $\bar{r}_0 \bar{r}_1 \bar{r}_2 \bar{r}_3 \bar{r}_4 r_5$ | 0.00001 | $0/32 < R^{(j)} < 2/32$ |
| $R_0$ | $\bar{r}_0 \bar{r}_1 \bar{r}_2 \bar{r}_3 \bar{r}_4 \bar{r}_5$ | 0.00000 | $-1/32 < R^{(j)} < 1/32$ |

FIG. 13a

| PARTIAL REMAINDER INTERVAL | LOGICAL EXPRESSION | VALUE OF $r_0^{(j)} r_1^{(j)} r_2^{(j)} r_3^{(j)} r_4^{(j)} r_5^{(j)}$ IN 2'S COMP. REPRESENTATION | RANGE OF $R^{(j)}$ | |
|---|---|---|---|---|
| | | | BINARY NOTATION | DECIMAL NOTATION |
| $R_{\overline{1}}$ | $r_0 r_1 r_2 r_3 r_4 r_5$ | 1.11111 | $-0.00000 > R^{(j)} > -0.00010$ | $-0/32 > R^{(j)} > -2/32$ |
| $R_{\overline{2}}$ | $r_0 r_1 r_2 r_3 r_4 \overline{r_5}$ | 1.11110 | $-0.00001 > R^{(j)} > -0.00011$ | $-1/32 > R^{(j)} > -3/32$ |
| $R_{\overline{3}}$ | $r_0 r_1 r_2 r_3 \overline{r_4} r_5$ | 1.11101 | $-0.00010 > R^{(j)} > -0.00100$ | $-2/32 > R^{(j)} > -4/32$ |
| $R_{\overline{4}}$ | $r_0 r_1 r_2 r_3 \overline{r_4} \overline{r_5}$ | 1.11100 | $-0.00011 > R^{(j)} > -0.00101$ | $-3/32 > R^{(j)} > -5/32$ |
| $R_{\overline{5}}$ | $r_0 r_1 r_2 \overline{r_3} r_4 r_5$ | 1.11011 | $-0.00100 > R^{(j)} > -0.00110$ | $-4/32 > R^{(j)} > -6/32$ |
| $R_{\overline{6}}$ | $r_0 r_1 r_2 \overline{r_3} r_4 \overline{r_5}$ | 1.11010 | $-0.00101 > R^{(j)} > -0.00111$ | $-5/32 > R^{(j)} > -7/32$ |
| $R_{\overline{7}}$ | $r_0 r_1 r_2 \overline{r_3} \overline{r_4} r_5$ | 1.11001 | $-0.00110 > R^{(j)} > -0.01000$ | $-6/32 > R^{(j)} > -8/32$ |
| $R_{\overline{8}}$ | $r_0 r_1 r_2 \overline{r_3} \overline{r_4} \overline{r_5}$ | 1.11000 | $-0.00111 > R^{(j)} > -0.01001$ | $-7/32 > R^{(j)} > -9/32$ |
| $R_{\overline{9}}$ | $r_0 r_1 \overline{r_2} r_3 r_4 r_5$ | 1.10111 | $-0.01000 > R^{(j)} > -0.01010$ | $-8/32 > R^{(j)} > -10/32$ |
| $R_{\overline{10}}$ | $r_0 r_1 \overline{r_2} r_3 r_4 \overline{r_5}$ | 1.10110 | $-0.01001 > R^{(j)} > -0.01011$ | $-9/32 > R^{(j)} > -11/32$ |
| $R_{\overline{11}}$ | $r_0 r_1 \overline{r_2} r_3 \overline{r_4} r_5$ | 1.10101 | $-0.01010 > R^{(j)} > -0.01100$ | $-10/32 > R^{(j)} > -12/32$ |
| $R_{\overline{12}}$ | $r_0 r_1 \overline{r_2} r_3 \overline{r_4} \overline{r_5}$ | 1.10100 | $-0.01011 > R^{(j)} > -0.01101$ | $-11/32 > R^{(j)} > -13/32$ |
| $R_{\overline{13}}$ | $r_0 r_1 \overline{r_2} \overline{r_3} r_4 r_5$ | 1.10011 | $-0.01100 > R^{(j)} > -0.01110$ | $-12/32 > R^{(j)} > -14/32$ |
| $R_{\overline{14}}$ | $r_0 r_1 \overline{r_2} \overline{r_3} r_4 \overline{r_5}$ | 1.10010 | $-0.01101 > R^{(j)} > -0.01111$ | $-13/32 > R^{(j)} > -15/32$ |

FIG. 13b

| | | | | |
|---|---|---|---|---|
| $R_{\overline{15}}$ | $r_0\overline{r_1}\overline{r_2}\overline{r_3}\overline{r_4}r_5$ | 1.10001 | $-0.01110 > R^{(j)} > -0.10000$ | $-14/32 > R^{(j)} > -16/32$ |
| $R_{\overline{16}}$ | $r_0\overline{r_1}\overline{r_2}\overline{r_3}r_4\overline{r_5}$ | 1.10000 | $-0.01111 > R^{(j)} > -0.10001$ | $-15/32 > R^{(j)} > -17/32$ |
| $R_{\overline{17}}$ | $r_0\overline{r_1}\overline{r_2}r_3\overline{r_4}\overline{r_5}$ | 1.01111 | $-0.10000 > R^{(j)} > -0.10010$ | $-16/32 > R^{(j)} > -18/32$ |
| $R_{\overline{18}}$ | $r_0\overline{r_1}\overline{r_2}r_3\overline{r_4}r_5$ | 1.01110 | $-0.10001 > R^{(j)} > -0.10011$ | $-17/32 > R^{(j)} > -19/32$ |
| $R_{\overline{19}}$ | $r_0\overline{r_1}\overline{r_2}r_3r_4\overline{r_5}$ | 1.01101 | $-0.10010 > R^{(j)} > -0.10100$ | $-18/32 > R^{(j)} > -20/32$ |
| $R_{\overline{20}}$ | $r_0\overline{r_1}\overline{r_2}r_3r_4r_5$ | 1.01100 | $-0.10011 > R^{(j)} > -0.10101$ | $-19/32 > R^{(j)} > -21/32$ |
| $R_{\overline{21}}$ | $r_0\overline{r_1}r_2\overline{r_3}\overline{r_4}\overline{r_5}$ | 1.01011 | $-0.10100 > R^{(j)} > -0.10110$ | $-20/32 > R^{(j)} > -22/32$ |
| $R_{\overline{22}}$ | $r_0\overline{r_1}r_2\overline{r_3}\overline{r_4}r_5$ | 1.01010 | $-0.10101 > R^{(j)} > -0.10111$ | $-21/32 > R^{(j)} > -23/32$ |
| $R_{\overline{23}}$ | $r_0\overline{r_1}r_2\overline{r_3}r_4\overline{r_5}$ | 1.01001 | $-0.10110 > R^{(j)} > -0.11000$ | $-22/32 > R^{(j)} > -24/32$ |
| $R_{\overline{24}}$ | $r_0\overline{r_1}r_2\overline{r_3}r_4r_5$ | 1.01000 | $-0.10111 > R^{(j)} > -0.11001$ | $-23/32 > R^{(j)} > -25/32$ |
| $R_{\overline{25}}$ | $r_0\overline{r_1}r_2r_3\overline{r_4}\overline{r_5}$ | 1.00111 | $-0.11000 > R^{(j)} > -0.11010$ | $-24/32 > R^{(j)} > -26/32$ |
| $R_{\overline{26}}$ | $r_0\overline{r_1}r_2r_3\overline{r_4}.$ | 1.0011X | $-0.11000 > R^{(j)} > -0.11100$ | $-24/32 > R^{(j)} > -28/32$ |
| $R_{\overline{27}}$ | $r_0\overline{r_1}r_2r_3$ | 1.001XX | $-0.11000 > R^{(j)} > -1.00000$ | $-24/32 > R^{(j)} > -32/32$ |

FIG. 14a

RANGE OF DIVISOR D

| PART. REMAINDER INTERV. | $q_j = 7$ | | $q_j = 6$ | | $q_j = 5$ | | $q_j = 4$ | | $q_j = 3$ | | $q_j = 2$ | |
|---|---|---|---|---|---|---|---|---|---|---|---|---|
| | $D_{min}$ | $D_{max}$ | $D_{min}$ | $D_{max}$ | $D_{min}$ | $D_{max}$ | $D_{min}$ | $D_{max}$ | $D_{min}$ | $D_{max}$ | $D_{min}$ | $D_{max}$ |
| $R_{27}$ | $32/64(-)$ | $64/64(24/24)$ | | | | | | | | | | |
| $R_{26}$ | $32/64(-)$ | $64/64(-)$ | | | | | | | | | | |
| $R_{25}$ | $32/64(-)$ | $64/64(24/24)$ | | | | | | | | | | |
| $R_{24}$ | $32/64(-)$ | $60/64(23/24)$ | $60/64(25/28)$ | $64/64(23/20)$ | | | | | | | | |
| $R_{23}$ | $32/64(-)$ | $56/64(22/24)$ | $56/64(24/28)$ | $64/64(22/20)$ | | | | | | | | |
| $R_{22}$ | $32/64(-)$ | $56/64(21/24)$ | $56/64(23/28)$ | $64/64(21/20)$ | | | | | | | | |
| $R_{21}$ | $32/64(-)$ | $52/64(20/24)$ | $52/64(22/28)$ | $64/64(20/20)$ | $56/64(21/24)$ | $64/64(19/16)$ | | | | | | |
| $R_{20}$ | $32/64(-)$ | $48/64(19/24)$ | $48/64(21/28)$ | $56/64(19/20)$ | $56/64(20/24)$ | $64/64(18/16)$ | | | | | | |
| $R_{19}$ | $32/64(-)$ | $48/64(18/24)$ | $48/64(20/28)$ | $56/64(18/20)$ | $56/64(19/24)$ | $64/64(17/16)$ | | | | | | |
| $R_{18}$ | $32/64(-)$ | $44/64(17/24)$ | $44/64(19/28)$ | $52/64(17/20)$ | $52/64(18/24)$ | $54/64(17/16)$ | | | | | | |
| $R_{17}$ | $32/64(-)$ | $42/64(16/24)$ | $42/64(18/28)$ | $48/64(16/20)$ | $48/64(17/24)$ | $64/64(16/16)$ | | | | | | |
| $R_{16}$ | $32/64(-)$ | $40/64(15/24)$ | $40/64(17/28)$ | $48/64(15/20)$ | $48/64(16/24)$ | $56/64(15/16)$ | $56/64(17/20)$ | $64/64(15/12)$ | | | | |
| $R_{15}$ | $32/64(-)$ | $37/64(14/24)$ | $37/64(16/28)$ | $44/64(14/20)$ | $44/64(15/24)$ | $56/64(14/16)$ | $56/64(16/20)$ | $64/64(14/12)$ | | | | |
| $R_{14}$ | $32/64(-)$ | $37/64(13/24)$ | $37/64(15/28)$ | $40/64(13/20)$ | $40/64(14/24)$ | $48/64(13/16)$ | $48/64(15/20)$ | $64/64(13/12)$ | | | | |

| PARTIAL REMAINDER INTERVAL | VALUE OF QUOTIENT DIGIT $q_j$ | DIVISOR INTERVAL | RANGE OF DIVISOR D | LOGICAL EXPRESSION |
|---|---|---|---|---|
| $R_0$ | 0 | $D_0(0)$ | $32/64 \leq D < 64/64$ | ALWAYS 1 |
| $R_1$ | 0 | $D_1(0)$ | $32/64 \leq D < 64/64$ | ALWAYS 1 |
| $R_2$ | 1 | $D_2(1)$ | $32/64 \leq D < 64/64$ | ALWAYS 1 |
| $R_3$ | 1 | $D_3(1)$ | $32/64 \leq D < 64/64$ | ALWAYS 1 |
| $R_4$ | 1 | $D_4(1)$ | $48/64 \leq D < 64/64$ | $\dfrac{d_2}{\overline{D_4(1)}}$ |
|  | 2 | $D_4(2)$ | $32/64 \leq D < 48/64$ |  |
| $R_5$ | 2 | $D_5(2)$ | $32/64 \leq D < 64/64$ | ALWAYS 1 |
| $R_6$ | 2 | $D_6(2)$ | $40/64 \leq D < 64/64$ | $\dfrac{d_2 + d_3}{\overline{D_6(2)}}$ |
|  | 3 | $D_6(3)$ | $32/64 \leq D < 40/64$ |  |
| $R_7$ | 2 | $D_7(2)$ | $48/64 \leq D < 64/64$ | $\dfrac{d_2}{\overline{D_7(2)}}$ |
|  | 3 | $D_7(3)$ | $32/64 \leq D < 48/64$ |  |
| $R_8$ | 2 | $D_8(2)$ | $48/64 \leq D < 64/64$ | $d_2$ |
|  | 3 | $D_8(3)$ | $36/64 \leq D < 48/64$ | $\overline{d_2} \cdot (d_3 + d_4)$ |
|  | 4 | $D_8(4)$ | $32/64 \leq D < 36/64$ | $\overline{d_2 + d_3 + d_4}$ |

FIG. 15b

| | | | | |
|---|---|---|---|---|
| $R_9$ | 3 | $D_9(3)$ | $48/64 \leq D < 64/64$ | $d_2 + d_3$ |
| | 4 | $D_9(4)$ | $32/64 \leq D < 40/64$ | $\overline{D_9(3)}$ |
| $R_{10}$ | 3 | $D_{10}(3)$ | $48/64 \leq D < 64/64$ | $d_2$ |
| | 4 | $D_{10}(4)$ | $36/64 \leq D < 48/64$ | $\overline{d_2} \cdot (d_3 + d_4)$ |
| | 5 | $D_{10}(5)$ | $32/64 \leq D < 36/64$ | $\overline{d_2 + d_3 + d_4}$ |
| $R_{11}$ | 3 | $D_{11}(3)$ | $48/64 \leq D < 64/64$ | $d_2$ |
| | 4 | $D_{11}(4)$ | $40/64 \leq D < 48/64$ | $\overline{d_2} \cdot d_3$ |
| | 5 | $D_{11}(5)$ | $32/64 \leq D < 40/64$ | $\overline{d_2 + d_3}$ |
| $R_{12}$ | 3 | $D_{12}(3)$ | $56/64 \leq D < 64/64$ | $d_2 \cdot d_3$ |
| | 4 | $D_{12}(4)$ | $44/64 \leq D < 56/64$ | $(d_3 \cdot d_4 + d_2) \cdot \overline{D_{12}(3)}$ |
| | 5 | $D_{12}(5)$ | $35/64 \leq D < 44/64$ | $\overline{(d_3 \cdot d_4 + d_2) \cdot D_{12}(6)}$ |
| | 6 | $D_{12}(6)$ | $32/64 \leq D < 35/64$ | $d_5 \cdot d_6 + d_2 + d_3 + d_4$ |
| $R_{13}$ | 4 | $D_{13}(4)$ | $48/64 \leq D < 64/64$ | $d_2$ |
| | 5 | $D_{13}(5)$ | $38/64 \leq D < 48/64$ | $\overline{D_{13}(4)} \cdot \overline{D_{13}(6)}$ |
| | 6 | $D_{13}(6)$ | $32/64 \leq D < 38/64$ | $\overline{d_4 \cdot d_5 + d_3 + d_2}$ |
| $R_{14}$ | 4 | $D_{14}(4)$ | $48/64 \leq D < 64/64$ | $d_2$ |
| | 5 | $D_{14}(5)$ | $40/64 \leq D < 48/64$ | $(d_3 + d_2) \cdot \overline{D_{14}(4)}$ |
| | 6 | $D_{14}(6)$ | $37/64 \leq D < 40/64$ | $\overline{(d_3 + d_2)} \cdot \overline{D_{14}(7)}$ |
| | 7 | $D_{14}(7)$ | $32/64 \leq D < 37/64$ | $\overline{d_4 \cdot d_6 + d_4 \cdot d_5 + d_3 + d_2}$ |

FIG. 16a

| PARTIAL REMAINDER INTERVAL | VALUE OF QUOTIENT DIGIT $q_j$ | DIVISOR INTERVAL | RANGE OF DIVISOR D | LOGICAL EXPRESSION |
|---|---|---|---|---|
| $R_{15}$ | 4 | $D_{15}(4)$ | $56/64 \leq D < 64/64$ | $d_2 \cdot d_3$ |
| | 5 | $D_{15}(5)$ | $44/64 \leq D < 56/64$ | $(d_3 \cdot d_4 + d_2) \cdot \overline{D_{15}(4)}$ |
| | 6 | $D_{15}(6)$ | $37/64 \leq D < 44/64$ | $\overline{(d_3 \cdot d_4 + d_2)} \cdot \overline{D_{15}(7)}$ |
| | 7 | $D_{15}(7)$ | $32/64 \leq D < 37/64$ | $\overline{d_4 \cdot d_6 + d_4 \cdot d_5 + d_3 + d_2}$ |
| $R_{16}$ | 4 | $D_{16}(4)$ | $56/64 \leq D < 64/64$ | $d_2 \cdot d_3$ |
| | 5 | $D_{16}(5)$ | $48/64 \leq D < 56/64$ | $d_2 \cdot \overline{D_{16}(4)}$ |
| | 6 | $D_{16}(6)$ | $40/64 \leq D < 48/64$ | $\overline{d_2} \cdot \overline{D_{16}(7)}$ |
| | 7 | $D_{16}(7)$ | $32/64 \leq D < 40/64$ | $\overline{d_3 + d_2}$ |
| $R_{17}$ | 5 | $D_{17}(5)$ | $48/64 \leq D < 64/64$ | $d_2$ |
| | 6 | $D_{17}(6)$ | $42/64 \leq D < 48/64$ | $\overline{D_{17}(5)} \cdot \overline{D_{17}(7)}$ |
| | 7 | $D_{17}(7)$ | $32/64 \leq D < 42/64$ | $\overline{d_3 \cdot d_5 + d_3 \cdot d_4 + d_2}$ |
| $R_{18}$ | 5 | $D_{18}(5)$ | $52/64 \leq D < 64/64$ | $d_2 \cdot d_4 + d_2 \cdot d_3$ |
| | 6 | $D_{18}(6)$ | $44/64 \leq D < 52/64$ | $\overline{D_{18}(5)} \cdot \overline{D_{18}(7)}$ |
| | 7 | $D_{18}(7)$ | $32/64 \leq D < 44/64$ | $d_3 \cdot d_4 + d_2$ |

FIG. 16b

| | | | | |
|---|---|---|---|---|
| $R_{19}$ | 5 | $D_{19}(5)$ | $56/64 \leq D < 64/64$ | $d_2 \cdot d_3$ |
| | 6 | $D_{19}(6)$ | $48/64 \leq D < 56/64$ | $\overline{D_{19}(5)} \cdot \overline{D_{19}(7)}$ |
| | 7 | $D_{19}(7)$ | $32/64 \leq D < 48/64$ | $\overline{d_2}$ |
| $R_{20}$ | 5 | $D_{20}(5)$ | $56/64 \leq D < 64/64$ | $d_2 \cdot d_3$ |
| | 6 | $D_{20}(6)$ | $48/64 \leq D < 56/64$ | $\overline{D_{20}(5)} \cdot \overline{D_{20}(7)}$ |
| | 7 | $D_{20}(7)$ | $32/64 \leq D < 48/64$ | $\overline{d_2}$ |
| $R_{21}$ | 6 | $D_{21}(6)$ | $52/64 \leq D < 64/64$ | $d_2 \cdot d_4 + d_2 \cdot d_3$ |
| | 7 | $D_{21}(7)$ | $32/64 \leq D < 52/64$ | $\overline{D_{21}(6)}$ |
| $R_{22}$ | 6 | $D_{22}(6)$ | $56/64 \leq D < 64/64$ | $d_2 \cdot d_3$ |
| | 7 | $D_{22}(7)$ | $32/64 \leq D < 56/64$ | $\overline{D_{22}(6)}$ |
| $R_{23}$ | 6 | $D_{23}(6)$ | $56/64 \leq D < 64/64$ | $d_2 \cdot d_3$ |
| | 7 | $D_{23}(7)$ | $32/64 \leq D < 56/64$ | $\overline{D_{23}(6)}$ |
| $R_{24}$ | 6 | $D_{24}(6)$ | $60/64 \leq D < 64/64$ | $d_2 \cdot d_3 \cdot d_4$ |
| | 7 | $D_{24}(7)$ | $32/64 \leq D < 60/64$ | $\overline{D_{24}(6)}$ |
| $R_{25}$ | 7 | $D_{25}(7)$ | $32/64 \leq D < 64/64$ | ALWAYS 1 |
| $R_{26}$ | 7 | $D_{25}(7)$ | $32/64 \leq D < 64/64$ | ALWAYS 1 |
| $R_{27}$ | 7 | $D_{25}(7)$ | $32/64 \leq D < 64/64$ | ALWAYS 1 |

FIG. 18

| VALUE OF QUOTIENT DIGIT $q_j$ | B: OUTPUT FROM THE CIRCUIT 54 | A: OUTPUT FROM THE CIRCUIT 53 | OPERATION BY THE CIRCUIT 55 TO OBTAIN C | OPERATION BY THE CIRCUIT 57 TO $R^{(j+3)}$ |
|---|---|---|---|---|
| -7 | D | 8D | A-B | $8R^{(j)}+C$ |
| -6 | 2D | 4D | A+B | $8R^{(j)}+C$ |
| -5 | D | 4D | A+B | $8R^{(j)}+C$ |
| -4 | '0' | 4D | A±B | $8R^{(j)}+C$ |
| -3 | D | 4D | A-B | $8R^{(j)}+C$ |
| -2 | 2D | '0' | A+B | $8R^{(j)}+C$ |
| -1 | D | '0' | A+B | $8R^{(j)}+C$ |
| 0 | '0' | '0' | A+B | $8R^{(j)}\pm C$ |
| 1 | D | '0' | A+B | $8R^{(j)}-C$ |
| 2 | 2D | '0' | A+B | $8R^{(j)}-C$ |
| 3 | D | 4D | A-B | $8R^{(j)}-C$ |
| 4 | '0' | 4D | A+B | $8R^{(j)}-C$ |
| 5 | D | 4D | A+B | $8R^{(j)}-C$ |
| 6 | 2D | 4D | A+B | $8R^{(j)}-C$ |
| 7 | D | 8D | A-B | $8R^{(j)}-C$ |

Fig. 20 (INTERMEDIATE CARRY, INTERMEDIATE SUM)

| | | | AUGEND / MINUEND $a_i$ | |
|---|---|---|---|---|
| | | | 0 | 1 |
| ADDITION | ADDITION | 0 | 0,0 | 1,$\bar{1}$ |
| | | 1 | 1,$\bar{1}$ | 1,0 |
| ADDEND / SUBTRAHEND | SUBTRACTION | $\bar{0}$ | 0,0 | 0,1 |
| | | $\bar{1}$ | $\bar{1}$,1 | 0,0 |

Fig. 21 (ADDITION / SUBTRACTION RESULT $c_i$)

| | | INTERMEDIATE CARRY FROM THE CELL $551_{i-1}$ | | | |
|---|---|---|---|---|---|
| ADDITION | | $\bar{1}$ | 0 | $\bar{1}$ | 1 |
| INTERMEDIATE SUM FROM THE CELL $551_i$ | 1 | 0 | 1 | 0 | 1 |
| | 0 | $\bar{1}$ | 0 | 1 | — |
| | $\bar{1}$ | — | $\bar{1}$ | 0 | 1 |

FIG. 23

| COMBINATION OF AUGEND / MINUEND & AUGEND / SUBTRAHEND | | (INTERMEDIATE CARRY, INTERMEDIATE SUM) |
|---|---|---|
| $(c_i, r_{i-3}^{(j)})$ | $(c_{i-1}, r_{i-4}^{(j)})$ | |
| (1,1) | Any value | 1, 0 |
| (1,0) (0,1) | (1,1) (0,1) (1,0) (0,0) | 1, $\bar{1}$ |
| | Other than the above | 0, 1 |
| (0,0) (1,$\bar{1}$) ($\bar{1}$,1) | Any value | 0, 0 |
| (0,$\bar{1}$) ($\bar{1}$,0) | ($\bar{1}$,$\bar{1}$) (0,$\bar{1}$) ($\bar{1}$,0) | $\bar{1}$, 1 |
| | OTHER THAN THE ABOVE | 0, $\bar{1}$ |
| ($\bar{1}$,$\bar{1}$) | ANY VALUE | $\bar{1}$, 0 |

FIG. 24

| ADDITION | INTERMEDIATE CARRY FROM THE CELL 571 j-1 (ADDITION/SUBTRACTION RESULT $r_i^{(j+3)}$) | | |
|---|---|---|---|
| | $\bar{1}$ | 0 | 1 |
| INTERMEDIATE SUM FROM THE CELL 571 i | $\bar{1}$ | | |
| $\bar{1}$ | $\bar{1}$ | 0 | 1 |
| 0 | 0 | 1 | 1 |
| 1 | $\bar{1}$ | 0 | 1 |

FIG. 26a

| PARTIAL REMAINDER INTERVAL | LOGICAL EXPRESSION | VALUE OF $r_0^{(j)} r_1^{(j)} r_2^{(j)} r_3^{(j)} r_4^{(j)}$ IN 2'S COMPLEMENT REPRESENTATION | RANGE OF $R^{(j)}$ | |
|---|---|---|---|---|
| | | | BINARY NOTATION | DECIMAL NOTATION |
| $R_{12}$ | $\overline{r_0} r_1 r_2$ | 0.11XX | $0.1100 \leq R^{(j)} < 1.0000$ | $12/16 \leq R^{(j)} < 16/16$ |
| $R_{11}$ | $\overline{r_0} r_1 \overline{r_2} r_3 r_4$ | 0.1011 | $0.1011 \leq R^{(j)} < 0.1100$ | $11/16 \leq R^{(j)} < 12/16$ |
| $R_{10}$ | $\overline{r_0} r_1 \overline{r_2} r_3 \overline{r_4}$ | 0.1010 | $0.1010 \leq R^{(j)} < 0.1011$ | $10/16 \leq R^{(j)} < 11/16$ |
| $R_9$ | $\overline{r_0} r_1 \overline{r_2} \overline{r_3} r_4$ | 0.1001 | $0.1001 \leq R^{(j)} < 0.1010$ | $9/16 \leq R^{(j)} < 10/16$ |
| $R_8$ | $\overline{r_0} r_1 \overline{r_2} \overline{r_3} \overline{r_4}$ | 0.1000 | $0.1000 \leq R^{(j)} < 0.1001$ | $8/16 \leq R^{(j)} < 9/16$ |
| $R_7$ | $\overline{r_0} \overline{r_1} r_2 r_3 r_4$ | 0.0111 | $0.0111 \leq R^{(j)} < 0.1000$ | $7/16 \leq R^{(j)} < 8/16$ |
| $R_6$ | $\overline{r_0} \overline{r_1} r_2 r_3 \overline{r_4}$ | 0.0110 | $0.0110 \leq R^{(j)} < 0.0111$ | $6/16 \leq R^{(j)} < 7/16$ |
| $R_5$ | $\overline{r_0} \overline{r_1} r_2 \overline{r_3} r_4$ | 0.0101 | $0.0101 \leq R^{(j)} < 0.0110$ | $5/16 \leq R^{(j)} < 6/16$ |
| $R_4$ | $\overline{r_0} \overline{r_1} r_2 \overline{r_3} \overline{r_4}$ | 0.0100 | $0.0100 \leq R^{(j)} < 0.0101$ | $4/16 \leq R^{(j)} < 5/16$ |
| $R_3$ | $\overline{r_0} \overline{r_1} \overline{r_2} r_3 r_4$ | 0.0011 | $0.0011 \leq R^{(j)} < 0.0100$ | $3/16 \leq R^{(j)} < 4/16$ |
| $R_2$ | $\overline{r_0} \overline{r_1} \overline{r_2} r_3 \overline{r_4}$ | 0.0010 | $0.0010 \leq R^{(j)} < 0.0011$ | $2/16 \leq R^{(j)} < 3/16$ |

FIG. 26b

| | | | |
|---|---|---|---|
| $R_1$ | $\bar{r}_0\bar{r}_1\bar{r}_2r_3r_4$ | 0.0001 | $0.0001 \leq R^{(j)} < 0.0010$ | $1/16 \leq R^{(j)} < 2/16$ |
| $R_0$ | $\bar{r}_0\bar{r}_1r_2\bar{r}_3\bar{r}_4$ | 0.0000 | $0.0000 \leq R^{(j)} < 0.0001$ | $0/16 \leq R^{(j)} < 1/12$ |
| $R_0$ | $r_0r_1r_2r_3r_4$ | 1.1111 | $-0.0000 > R^{(j)} \geq -0.0001$ | $-0/16 > R^{(j)} \geq -1/16$ |
| $R_1$ | $r_0r_1r_2r_3\bar{r}_4$ | 1.1110 | $-0.0001 > R^{(j)} \geq -0.0010$ | $-1/16 > R^{(j)} \geq -2/16$ |
| $R_2$ | $r_0r_1r_2\bar{r}_3r_4$ | 1.1101 | $-0.0010 > R^{(j)} \geq -0.0011$ | $-2/16 > R^{(j)} \geq -3/16$ |
| $R_3$ | $r_0r_1r_2\bar{r}_3\bar{r}_4$ | 1.1100 | $-0.0011 > R^{(j)} \geq -0.0100$ | $-3/16 > R^{(j)} \geq -4/16$ |
| $R_4$ | $r_0r_1\bar{r}_2r_3r_4$ | 1.1011 | $-0.0100 > R^{(j)} \geq -0.0101$ | $-4/16 > R^{(j)} \geq -5/16$ |
| $R_5$ | $r_0r_1\bar{r}_2r_3\bar{r}_4$ | 1.1010 | $-0.0101 > R^{(j)} \geq -0.0110$ | $-5/16 > R^{(j)} \geq -6/16$ |
| $R_6$ | $r_0r_1\bar{r}_2\bar{r}_3r_4$ | 1.1001 | $-0.0110 > R^{(j)} \geq -0.0111$ | $-6/16 > R^{(j)} \geq -7/16$ |
| $R_7$ | $r_0r_1\bar{r}_2\bar{r}_3\bar{r}_4$ | 1.1000 | $-0.0111 > R^{(j)} \geq -0.1000$ | $-7/16 > R^{(j)} \geq -8/16$ |
| $R_8$ | $r_0\bar{r}_1r_2r_3r_4$ | 1.0111 | $-0.1000 > R^{(j)} \geq -0.1001$ | $-8/16 > R^{(j)} \geq -9/16$ |
| $R_9$ | $r_0\bar{r}_1r_2r_3\bar{r}_4$ | 1.0110 | $-0.1001 > R^{(j)} \geq -0.1010$ | $-9/16 > R^{(j)} \geq -10/16$ |
| $R_{10}$ | $r_0\bar{r}_1r_2\bar{r}_3r_4$ | 1.0101 | $-0.1010 > R^{(j)} \geq -0.1011$ | $-10/16 > R^{(j)} \geq -11/16$ |
| $R_{11}$ | $r_0\bar{r}_1r_2\bar{r}_3\bar{r}_4$ | 1.0100 | $-0.1011 > R^{(j)} \geq -0.1100$ | $-11/16 > R^{(j)} \geq -12/16$ |
| $R_{12}$ | $r_0\bar{r}_1\bar{r}_2$ | 1.00XX | $-0.1100 > R^{(j)} \geq -1.0000$ | $-12/16 > R^{(j)} \geq -16/16$ |

FIG. 27a

| PARTIAL REMAINDER INTERVAL | RANGE OF DIVISOR D | | | | | | |
|---|---|---|---|---|---|---|---|
| | $q_j = 7$ | | $q_j = 6$ | | $q_j = 5$ | | $q_j = 4$ |
| | $D_{min}$ | $D_{max}$ | $D_{min}$ | $D_{max}$ | $D_{min}$ | $D_{max}$ | $D_{min}$ |
| $R_{12}$ | $\frac{32}{64}(-)$ | $\frac{34}{64}\left(\frac{12}{12}\right)$ | | | | | |
| $R_{11}$ | $\frac{32}{64}\left(\frac{12}{16}\right)$ | $\frac{56}{64}\left(\frac{11}{12}\right)$ | $\frac{56}{64}\left(\frac{12}{14}\right)$ | $\frac{64}{64}\left(\frac{11}{10}\right)$ | | | |
| $R_{10}$ | $\frac{32}{64}\left(\frac{11}{16}\right)$ | $\frac{52}{64}\left(\frac{10}{12}\right)$ | $\frac{52}{64}\left(\frac{11}{14}\right)$ | $\frac{64}{64}\left(\frac{10}{10}\right)$ | | | |
| $R_9$ | $\frac{32}{64}\left(\frac{10}{16}\right)$ | $\frac{48}{64}\left(\frac{19}{12}\right)$ | $\frac{48}{64}\left(\frac{10}{14}\right)$ | $\frac{56}{64}\left(\frac{9}{10}\right)$ | $\frac{56}{64}\left(\frac{10}{12}\right)$ | $\frac{64}{64}\left(\frac{9}{8}\right)$ | |
| $R_8$ | $\frac{32}{64}\left(\frac{9}{16}\right)$ | $\frac{42}{64}\left(\frac{8}{12}\right)$ | $\frac{42}{64}\left(\frac{9}{14}\right)$ | $\frac{50}{64}\left(\frac{8}{10}\right)$ | $\frac{50}{64}\left(\frac{9}{12}\right)$ | $\frac{64}{64}\left(\frac{8}{8}\right)$ | |
| $R_7$ | $\frac{32}{64}\left(\frac{8}{16}\right)$ | $\frac{37}{64}\left(\frac{7}{12}\right)$ | $\frac{37}{64}\left(\frac{8}{14}\right)$ | $\frac{44}{64}\left(\frac{7}{10}\right)$ | $\frac{44}{64}\left(\frac{8}{12}\right)$ | $\frac{56}{64}\left(\frac{7}{8}\right)$ | $\frac{56}{64}\left(\frac{8}{6}\right)$ |
| $R_6$ | | | $\frac{32}{64}\left(\frac{7}{14}\right)$ | $\frac{38}{64}\left(\frac{6}{10}\right)$ | $\frac{38}{64}\left(\frac{7}{12}\right)$ | $\frac{46}{64}\left(\frac{6}{8}\right)$ | $\frac{46}{64}\left(\frac{7}{6}\right)$ |
| $R_5$ | | | | | $\frac{32}{64}\left(\frac{6}{12}\right)$ | $\frac{40}{64}\left(\frac{5}{8}\right)$ | $\frac{40}{64}\left(\frac{6}{6}\right)$ |
| $R_4$ | | | | | | | $\frac{32}{64}\left(\frac{5}{6}\right)$ |
| $R_3$ | | | | | | | |
| $R_2$ | | | | | | | |
| $R_1$ | | | | | | | |
| $R_0$ | | | | | | | |

FIG. 27b

| | $q^{(j)} = 3$ | | | $q^{(j)} = 2$ | | $q^{(j)} = 1$ | | $q^{(j)} = 0$ | |
|---|---|---|---|---|---|---|---|---|---|
| | Dmax | Dmin | Dmax | Dmin | Dmax | Dmin | Dmax | Dmin | Dmax |
| | | | | | | | | | |
| | | | | | | | | | |
| | | | | | | | | | |
| | | | | | | | | | |
| | | | | | | | | | |
| | | | | | | | | | |
| | 64/64 (7/6) | | | | | | | | |
| | 64/64 (6/6) | | | | | | | | |
| | 52/64 (5/6) | 52/64 (6/8) | 64/64 (5/4) | | | | | | |
| | 42/64 (4/6) | 42/64 (5/8) | 64/64 (4/4) | | | | | | |
| | | 32/64 (4/8) | 48/64 (3/4) | 48/64 (4/6) | 64/64 (3/2) | | | | |
| | | | | 32/64 (3/6) | 64/64 (2/2) | | | | |
| | | | | | | 32/64 (2/4) | 64/64 (-) | | |
| | | | | | | | | 32/64 (-) | 64/64 (-) |

FIG. 28a

| PARTIAL REMAINDER INTERVAL | VALUE OF QUOTIENT DIGIT $q_j$ | DIVISOR INTERVAL | RANGE OF DIVISOR D | LOGICAL EXPRESSION |
|---|---|---|---|---|
| $R_0$ | 0 | $D_0(0)$ | $32/64 \leq D < 64/64$ | ALWAYS 1 |
| $R_1$ | 1 | $D_1(1)$ | $32/64 \leq D < 64/64$ | ALWAYS 1 |
| $R_2$ | 2 | $D_2(2)$ | $32/64 \leq D < 64/64$ | ALWAYS 1 |
| $R_3$ | 2 | $D_3(2)$ | $48/64 \leq D < 64/64$ | $d_2$ |
|  | 3 | $D_3(3)$ | $32/64 \leq D < 48/64$ | $\overline{d_2}$ |
| $R_4$ | 3 | $D_4(3)$ | $42/64 \leq D < 64/64$ | $d_3 \cdot d_5 + d_2 + d_3 \cdot d_4$ |
|  | 4 | $D_4(4)$ | $32/64 \leq D < 42/64$ | $\overline{d_2} \cdot \overline{d_3} + \overline{d_2} \cdot \overline{d_4} \cdot \overline{d_5}$ |
| $R_5$ | 3 | $D_5(3)$ | $52/64 \leq D < 64/64$ | $d_2 \cdot d_3 + d_2 \cdot d_4$ |
|  | 4 | $D_5(4)$ | $40/64 \leq D < 52/64$ | $\overline{d_2} \cdot d_3 + d_2 \cdot \overline{d_3} \cdot d_4$ |
|  | 5 | $D_5(5)$ | $32/64 \leq D < 40/64$ | $\overline{d_2} \cdot \overline{d_3}$ |
| $R_6$ | 4 | $D_6(4)$ | $46/64 \leq D < 64/64$ | $d_2 + d_3 \cdot d_4 \cdot d_5$ |
|  | 5 | $D_6(5)$ | $38/64 \leq D < 46/64$ | $\overline{D_6(4)} \cdot \overline{D_6(6)}$ |
|  | 6 | $D_6(6)$ | $32/64 \leq D < 38/64$ | $\overline{d_2} \cdot \overline{d_3} \cdot \overline{d_4} + \overline{d_2} \cdot \overline{d_3} \cdot \overline{d_5}$ |

FIG. 28b

| | | | | | |
|---|---|---|---|---|---|
| $R_7$ | 4 | $D_7(4)$ | $56/64$ ≤ D < $64/64$ | $d_2 \cdot d_3$ |
| | 5 | $D_7(5)$ | $44/64$ ≤ D < $56/64$ | $\overline{d_2} \cdot d_3 \cdot d_4 + d_2 \cdot \overline{d_3}$ |
| | 6 | $D_7(6)$ | $37/64$ ≤ D < $44/64$ | $\overline{D_7(4)} \cdot \overline{D_7(5)} \cdot \overline{D_7(7)}$ |
| | 7 | $D_7(7)$ | $32/64$ ≤ D < $37/64$ | $\overline{d_2} \cdot \overline{d_3} \cdot \overline{d_4} + \overline{d_2} \cdot \overline{d_3} \cdot \overline{d_5} \cdot d_6$ |
| $R_8$ | 5 | $D_8(5)$ | $50/64$ ≤ D < $64/64$ | $d_2 \cdot d_5 + d_2 \cdot d_3 + d_2 \cdot d_4$ |
| | 6 | $D_8(6)$ | $42/64$ ≤ D < $50/64$ | $\overline{D_8(5)} \cdot \overline{D_8(7)}$ |
| | 7 | $D_8(7)$ | $32/64$ ≤ D < $42/64$ | $\overline{d_2} \cdot \overline{d_3} + \overline{d_2} \cdot \overline{d_4} \cdot \overline{d_5}$ |
| $R_9$ | 5 | $D_9(5)$ | $56/64$ ≤ D < $64/64$ | $d_2 \cdot d_3$ |
| | 6 | $D_9(6)$ | $48/64$ ≤ D < $56/64$ | $\overline{d_2} \cdot \overline{d_3}$ |
| | 7 | $D_9(7)$ | $32/64$ ≤ D < $48/64$ | $\overline{d_2}$ |
| $R_{10}$ | 6 | $D_{10}(6)$ | $52/64$ ≤ D < $64/64$ | $d_2 \cdot d_4 + d_2 \cdot d_3$ |
| | 7 | $D_{10}(7)$ | $32/64$ ≤ D < $52/64$ | $\overline{d_3} \cdot \overline{d_4} + \overline{d_2}$ |
| $R_{11}$ | 6 | $D_{11}(6)$ | $56/64$ ≤ D < $64/64$ | $d_2 \cdot d_3$ |
| | 7 | $D_{11}(7)$ | $32/64$ ≤ D < $56/64$ | $\overline{d_3} + \overline{d_2}$ |
| $R_{12}$ | 7 | $D_{12}(7)$ | $32/64$ ≤ D < $64/64$ | ALWAYS 1 |

FIG. 29a

| VALUE OF QUOTIENT DIGIT $q_j$ | B: OUTPUT FROM THE CIRCUIT 74 |
|---|---|
| -7 | D |
| -6 | 2D |
| -5 | D |
| -4 | '0' |
| -3 | D |
| -2 | 2D |
| -1 | D |
| 0 | '0' |
| 1 | D |
| 2 | 2D |
| 3 | D |
| 4 | '0' |
| 5 | D |
| 6 | 2D |
| 7 | D |

FIG. 29b

| A: OUTPUT FROM THE CIRCUIT 73 | OPERATION BY THE CIRCUIT 77 TO OBTAIN $R^{(j+3)}$ |
|---|---|
| 8D | $8R^{(j)} + A - B$ |
| 4D | $8R^{(j)} + A + B$ |
| 4D | $8R^{(j)} + A + B$ |
| 4D | $8R^{(j)} + A \pm B$ |
| 4D | $8R^{(j)} + A - B$ |
| '0' | $8R^{(j)} \pm A + B$ |
| '0' | $8R^{(j)} \pm A + B$ |
| '0' | $8R^{(j)} \pm A \pm B$ |
| '0' | $8R^{(j)} \pm A - B$ |
| '0' | $8R^{(j)} \pm A - B$ |
| 4D | $8R^{(j)} - A + B$ |
| 4D | $8R^{(j)} - A \pm B$ |
| 4D | $8R^{(j)} - A - B$ |
| 4D | $8R^{(j)} - A - B$ |
| 8D | $8R^{(j)} - A + B$ |

ITERATIVE HIGH RADIX DIVIDER DECODING THE UPPER BITS OF A DIVISOR AND DIVIDEND

BACKGROUND OF THE INVENTION (1) Field of the Invention

This invention relates to a divider unit for executing a division in which a dividend and a divisor are both fixed-point parts of a floating-point number or a division in which a dividend and a divisor are both fixed-point numbers, the divider unit being applied in an information processor or the like.

(2) Description of the Related Art

Recently, an operation unit for executing high-speed floating-point operation has been demanded in a lot of information processing fields such as signal processing and numerical calculation.

A division procedure generally takes much longer than an addition, subtraction or multiplication procedure. Executing such division procedure at a high speed cannot be realized without a huge-scale hardware.

Ever since a computer was first developed, division algorithms have been actively researched in order to obtain a divider unit for executing a high-speed division with simple hardware. Some of the algorithms which have been developed so far are mentioned in:

1) Kai Hwang, "Computer Arithmetic/Principles, Architecture, and Design," John Wiley & Sons, 1980;

2) D. E. Atkins, "Higher-Radix Division Using Estimates of the Divisor and Partial Remainders," IEEE Transactions on Computers, Vol. C-17, No. 10, pp. 925-934, Oct. 1968; and 3) D. E. Atkins, "Design of the Arithmetic Units of ILLIAC III: Use of Redundancy and Higher Radix Methods," IEEE Transactions on Computers, Vol. C-19, No. 8, pp. 720-733, Aug. 1970.

According to the above publications, a quotient $Q_n$ (to be obtained by dividing a dividend $R^{(0)}$ by a divisor d) and a value $R^{(n+2)}$ (to be obtained by multiplying a final remainder by $2^j$; j=a multiple of two) are obtained by executing the following algorithm. The quotient $Q_n$ has a bit length of n (n=a multiple of two) to the right of the binary point. $R^{(n+2)}$ will be referred to simply as the final remainder, hereinafter.

The following algorithm is a radix-4 case. In other words, the quotient $Q_n$ is obtained two digits by two digits. Each two digits are at the j-1'th and the j'th binary places in the binary representation and form a quotient digit $q_j$. A quotient from the first to the j'th binary places is referred to as $Q_j$.

A value obtained by multiplying a partial remainder by $2^j$ is represented by $R^{(j)}$. $R^{(j)}$ is used to obtain the quotient digit $q_j$ and will be referred to simply as the partial remainder, hereinafter. The value at the i'th binary place of the partial remainder $R^{(j)}$ expressed in the two's complement representation is referred to as $A_i$. A value at the i'th binary place of the divisor d is referred to as $M_i$. In summary, $$R^{(j)} = A_0.A_1A_2A_3A_4\ldots$$

$$Q_j = q_0.q_2q_4\ldots q_j$$

$$d = 0.M_1M_2M_3M_4\ldots$$

where $A_0$ indicates a sign in the two's complement representation.

The partial remainder $R^{(j)}$ and the quotient digit $q_j$ are expressed in the redundant binary representation. In other words, each digit in the binary representation is expressed by two bits: a sign bit and an absolute value bit.

---

\<Step 1\>
Normalize the dividend $R^{(0)}$ and the divisor d as follows:
  $2^{-1} \leq R^{(0)} < 1$
  $2^{-1} \leq d < 1$
If normalization has already been done, this step is not necessary.
\<Step 2\>
  $q_0 := [01]_2$;
  $Q_0 := q_0$;
  $R^{(2)} := R^{(0)} - q_0 \cdot d$;
\<Step 3\>
  for j:=2 to n+1 step 2 do
  begin
    Select a quotient digit $q_j$ in accordance with FIGS. 1 and 2.
    $R^{(j+2)} := 4R^{(j)} - q_j \cdot d$;
    $Q_j := Q_{j-2} + q_j \cdot 2^{-j}$;
  end
\<Step 4\>
  if $R^{(n+2)} < 0$ then
  begin
    $Q_n := Q_n - 2^{-n}$
    $R^{(n+2)} := R^{(n+2)} + d$;
  end
\<Step 5\>

---

Convert the quotient $Q_n$ into the two's complement representation. If necessary, convert the final remainder $R^{(n+2)}$ into the two's complement representation.

The above description is conformed to the Pascal program language. ":=" is an operator indicating substitution, and "[...]$_2$" indicates the value in the bracket is expressed in the binary representation. Step 3 is repeated, in which each round will be referred to as a loop in this specification.

FIG. 1 shows a divisor interval selection logic for selecting one interval which a divisor d belongs to out of a plurality of intervals bordered by specified values. Variables $D_1$ through $D_{11}$ represent the operation results obtained by the logical expressions shown in FIG. 1. Only one of the variables $D_1$ through $D_{11}$ is set to be 1.

FIG. 2 shows a quotient digit selection logic for selecting a quotient digit $q_j$ based on the variables $D_1$ through $D_{11}$ and the partial remainder $R^{(j)}$. Variables zeroP, etc. represent the operation results obtained by the logical expressions shown in FIG. 2. Only one of the variables is set to be 1, and the corresponding quotient digit to the above one variable is selected.

In FIGS. 1 and 2, each bar above the variable means logical NOT. In FIG. 2, each bar above the figure in the quotient digit column indicates that the figure below the bar is negative. For instance, $\bar{1}$ means $-1$.

FIG. 3 is a block diagram of a conceivable divider unit 100 for executing a division using the above algorithm.

1 refers to a divisor interval selection circuit for selecting one interval which the divisor d belongs to out of a plurality of intervals bordered by specified values based on $M_2$, $M_3$ and $M_4$ in accordance with FIG. 1.

3 refers to a quotient digit selection circuit for selecting one value as a quotient digit $q_j$ out of values $-2$, $-1$, 0, 1 and 2, of which absolute values are each represented in two bits. The selection is done based on the selection result of the circuit 1 and $A_0$ through $A_6$ in accordance with FIG. 2. $A_0$ through $A_6$ are obtained from a partial remainder $R^{(j)}$ outputted by a subsequent partial remainder generation circuit 17 (will be described later in detail). $A_0$ is a sign of a value obtained by converting the upper six digits of the partial remainder $R^{(j)}$ into the two's complement representation. $A_1$ through $A_6$ are values at the first through the sixth binary places of the above value. The circuit 3 is to output a value 1 as a quotient digit $q_0$ on an initial stage of the division. The circuit 3 is also to send a selection command to a divisor's multiple selection circuit 13 (will be described later in detail) and an addition/subtraction command to a subsequent partial remainder generation circuit 17.

4 refers to a positive quotient digit storage circuit for storing the absolute value of the quotient digit $q_j$ if the quotient digit $q_j$ selected by the circuit 3 is positive and storing a value 0 if not. Either value is stored at a digit position corresponding to the loop in which the storage is executed.

5 refers to a negative quotient digit storage circuit for storing the absolute value of the quotient digit $q_j$ if the quotient digit $q_j$ is negative and storing the value 0 if not. Again, either value is stored at a digit position corresponding to the loop in which the storage is executed.

6 refers to a quotient conversion circuit for subtracting the value of the circuit 5 from the value of the circuit 4, whereby to output the subtraction result as a quotient $Q_n$.

10 refers to a divisor's double generation circuit for generating the double of the divisor d.

The divisor's multiple selection circuit 13 is for outputting the product of the absolute value of the quotient digit $q_j$ and the divisor d (namely, the divisor d, the double of the divisor d or 0) in response to the selection command from the circuit 3.

16 refers to a partial remainder's quadruple generation circuit for generating the quadruple of the partial remainder R(j) sent from the subsequent partial remainder generation circuit 17.

The subsequent partial remainder generation circuit 17 is for subtracting the divisor d from a dividend $R^{(0)}$, both normalized by a normalization circuit (not shown), and outputting the subtraction result as a first partial remainder $R^{(2)}$ on the initial stage of the division. The circuit 17 is then to subtract the value sent by the circuit 13 from the quadruple of the partial remainder $R^{(j)}$ if the quotient digit $q_j$ is positive and add the above value and the above quadruple if the quotient digit $q_j$ is negative, in response to the addition/subtraction command from the circuit 3.

The above addition and subtraction are done in the redundant binary scheme, and the partial remainder $R^{(j)}$ is also obtained in the redundant binary representation.

The divider unit 100 having the above construction executes the division in the following way.

1) When the normalized dividend $R^{(0)}$ and divisor d are inputted, the subsequent partial remainder generation circuit 17 subtracts the divisor d from the dividend $R^{(0)}$ and outputs the first partial remainder $R^{(2)}$. The quotient digit selection circuit 3 outputs the value 1 as the quotient digit $q_0$ (the value at ones place in the binary representation) and stores the above value 1 in the positive quotient digit storage circuit 4.

2) The divisor interval selection circuit 1 decodes $M_2$ through $M_4$ in accordance with FIG. 1 and then selects the interval which the divisor d belongs to. Such selection is done only once on the initial stage of the division, and the selection result is retained until the division is finished.

3) The quotient digit selection circuit 3 converts the upper six digits of the first partial remainder $R^{(2)}$ sent by the circuit 17 into the two's complement representation, thereby obtaining $A_0$ through $A_6$. Based on $A_0$ through $A_6$ and the selection result of the circuit 1, the circuit 3 selects one value as a quotient digit $q_2$ out of $-2, -1, 0, 1$ and 2 in accordance with FIG. 2 and outputs the selected value. As mentioned before, the values $-2, -1, 0, 1$ and 2 each have an absolute value represented in two bits.

4) On receiving the quotient digit $q_2$ from the circuit 3, the positive quotient digit storage circuit 4 stores the absolute value of the quotient digit $q_2$ at a digit position in the circuit 4 if the quotient digit $q_2$ is positive, the digit position corresponding to a first loop. If the quotient digit $q_2$ is not positive, the circuit 4 stores 0 at the same digit position.

On the contrary, the negative quotient digit storage circuit 5 stores the absolute value of the quotient digit $q_2$ at a digit position in the circuit 5 if the quotient digit $q_2$ is negative, the digit position corresponding to the first loop. If the quotient digit $q_2$ is not negative, the circuit 5 stores 0 at the same digit position.

5) The divisor's multiple selection circuit 13 outputs the product of the absolute value of the quotient digit $q_2$ and the divisor d in response to the selection command from the circuit 3.

6) On receiving the addition/subtraction command from the circuit 3, the subsequent partial remainder generation circuit 17 subtracts the value sent by the circuit 13 from the quadruple of the partial remainder $R^{(2)}$ if the quotient digit $q_2$ is positive and adds the above value and the above quadruple if the quotient digit $q_2$ is negative, whereby outputting a second partial remainder $R^{(4)}$. Then, the operation goes back to 3) for the next loop, wherein $R^{(4)}$ is used instead of $R^{(2)}$.

7) The above 3) to 6) is repeated n/2 times (the figures in binary places are counted as one) while incrementing each superscript and subscript by two. In this way, each quotient digit $q_j$ is obtained in the redundant binary representation, and the quotient digit $q_j$ is stored in the circuit 4 or 5 depending on the sign thereof. Then, a final remainder $R^{(n+2)}$ is outputted from the circuit 17.

8) The quotient conversion circuit 6 subtracts the value stored in the circuit 5 from the value stored in the circuit 4 and converts the subtraction result into the two's complement representation. If the final remainder $R^{(n+2)}$ is negative, the circuit 6 subtracts a value 1 at the lowest bit of the above subtraction result in the two's complement representation, whereby the quotient $Q_n$ is obtained. If necessary, the circuit 6 also converts the final remainder $R^{(n+2)}$ into the two's complement representation in the same manner by a final remainder compensation circuit (not shown), and if the obtained value is negative, adds the divisor d thereto.

In the above divider unit 100, the times the operation of the loop is repeated is approximately as half as in other types of divider units which are designed to execute the SRT division of radix-2 cases or the nonrestoring division. Further, since the subsequent partial remainder generation circuit 17 is controlled to operate in the redundant binary scheme, which requires no carry propagation, the operation time of each loop is shortened. As a result of the above two advantages, the above divider unit 100 executes the division nearly twice as fast as the above other types of divider units.

In a divider unit designed to execute the SRT division of radix-4 cases, the quotient digit is selected out of −3, −2, −1, 0, 1, 2 and 3. In the above divider unit 100, on the other hand, the quotient digit is selected only out of −2, −1, 0, 1 and 2. Accordingly, the circuit for obtaining the product of the quotient digit and the divisor comprises only two circuits: the divisor's double generation circuit 10 and the divisor's multiple selection circuit 13. As a result, simple hardware and high-speed execution are realized.

However, the above divider unit 100 has the following problem. The quotient digit selection logic is complicated enough to require a quotient digit selection decoder for decoding a lot of upper bits of the partial remainder and the divisor. The addition of such a decoder enlarges the hardware of the quotient digit selection circuit 3 and prolongs the quotient digit selection time.

Moreover, application of the above divider unit 100 to higher-radix division of radix-8 or more is quite impossible because such application would further complicate the quotient digit selection decoder and prolong the quotient digit selection.

SUMMARY OF THE INVENTION

Accordingly, this invention has an object of offering a divider unit for executing a division at a much higher speed than the conventional units by a simpler quotient digit selection logic while keeping the hardware compact.

The above object is fulfilled by a divider unit for executing a high radix division using a partial remainder expressed in the two's complement representation, the unit comprising a quotient digit selecting device for selecting one quotient digit out of all quotient digits obtainable under an applied radix based on values of a part of upper digits of a divisor and of a part of upper digits of a partial remainder and on a sign of the partial remainder; a plurality of divisor's multiple generating devices, each for generating at least one of a value 0 and another value obtained by multiplying the divisor with $2^j$, where j is an integer; and an adding and subtracting device having at least three inputs for selectively executing an addition and a subtraction using outputs from the divisor's multiple generating devices and a value obtained by multiplying the partial remainder by the value of the radix, whereby to generate another partial remainder.

The above object is also fulfilled by a divider unit for executing a high radix division using a partial remainder expressed in the redundant binary representation, the unit comprising a quotient digit selecting device for selecting one quotient digit out of all quotient digits obtainable under an applied radix based on values of a part of upper digits of a divisor and of a part of upper digits of a partial remainder; a plurality of divisor's multiple generating devices, each for generating at least one of a value 0 and another value obtained by multiplying the divisor with $2^j$, where j is an integer; a first adding and subtracting device for selectively executing an addition and a subtraction using outputs from the divisor's multiple generating devices, whereby to generate a product of the quotient digit selected by the quotient digit selecting device and the divisor, the product being expressed in the redundant binary representation; and a second adding and subtracting device for selectively executing an addition and a subtraction using an output from the first adding and subtracting device and a value obtained by multiplying the partial remainder by the value of the radix, whereby to generate another partial remainder in the redundant binary representation.

The above object is also fulfilled by a divider unit for executing a radix-8 division, the unit comprising a partial remainder interval selecting device for selecting a partial remainder interval which a primary partial remainder belongs to out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder; a divisor interval selecting device for selecting a divisor interval which a normalized divisor belongs to out of a plurality of intervals obtained by dividing a range of the divisor using specified constants as borders, the above selection being done using five bits at the second binary place and to the right thereof of the divisor; a quotient digit selecting device for generating a value 1 as a first quotient digit on an initial stage of a division, and thereafter selecting a second quotient digit from −7, −6, −5, −4, −3, −2, −1, 0, 1, 2, 3, 4, 5, 6 and 7 in accordance with the combination of the partial remainder interval and the divisor interval; a divisor's multiple generating device for generating a product of the second quotient digit and the divisor; and a subsequent partial remainder generating device for subtracting the divisor from a normalized dividend and outputting the subtraction result as an initial partial remainder in the two's complement representation on the initial stage of the division, and thereafter subtracting the above product from the octuple of the primary partial remainder in the two's complement representation and outputting the subtraction result as a secondary partial remainder in the two's complement representation.

The above object is also fulfilled by a divider unit for executing a radix-8 division, the unit comprising a partial remainder interval selecting device for selecting a partial remainder interval which a primary partial remainder belongs to out of a plurality of intervals obtained by dividing a range of values in which the primary partial remainder is obtainable, the range being divided using specified constants as borders, the above selection being done using six bits at ones place and to the right thereof of the primary partial remainder; a divisor interval selecting device for selecting a divisor interval which a normalized divisor belongs to out of a plurality of intervals obtained by dividing a range of the divisor using specified constants as borders, the above selection being done using five bits at the second binary place and to the right thereof of the divisor; a quotient digit selecting device for generating a value 1 as a first quotient digit on an initial stage of a division, and thereafter selecting a second quotient digit from −7, −6, −5, −4, −3, −2, −1, 0, 1, 2, 3, 4, 5, 6 and 7 in accordance with the combination of the partial remainder interval and the divisor interval; a divisor's multiple generating device for generating a product of the second quotient digit and the divisor; and a subsequent partial remainder generating device for subtracting the divisor from a normalized dividend and outputting the subtraction result as an initial partial remainder in the redundant binary representation on the initial stage of the division, and thereafter subtracting the above product from the octuple of the primary partial remainder in the redundant binary representation and outputting the subtraction result as a secondary partial remainder in the redundant binary representation.

The above object is also fulfilled by a divider unit for executing a radix-4 division, the unit comprising a partial remainder interval selecting device for selecting a partial remainder interval which a primary partial remainder belongs to out of a plurality of intervals obtained by dividing a range of values in which the primary partial remainder is obtainable, the range being divided using specified constants as borders, the above selection being done using two bits to the right of the binary point of the primary partial remainder and a sign of the primary partial remainder; a quotient digit selecting device for generating a value 1 as a first quotient digit on an initial stage of a division and thereafter selecting the second quotient digit from $-3, -2, -1, 0, 1, 2$ and $3$ in accordance with the combination of the partial remainder interval and a bit at the second binary place of a normalized divisor; a divisor's multiple generating device for generating a product of the second quotient digit and the divisor; and a subsequent partial remainder generating device for subtracting the divisor from a normalized dividend and outputting the subtraction result as an initial partial remainder in the two's complement representation on the initial stage of the division, and thereafter subtracting the above product from the quadruple of the primary partial remainder in the two's complement representation and outputting the subtraction result as a secondary partial remainder in the two's complement representation.

In a divider unit having a construction as mentioned above, a quotient digit is selected from all the values which are obtainable under the specified radix, based on a part of upper digits of a divisor and also a part of upper digits of a partial remainder. This system has two main advantages: 1) the hardware is compact owing to the simple quotient digit selection logic and 2) a high-speed division is realized since the time required for a loop operation is shortened.

The conventional divider units limit the selection range for the quotient digit in order to easily obtain the product of the quotient digit and the divisor. The inventor of the present invention found out that the division speed is enhanced by simplifying the quotient digit selection logic rather than simplifying the operation for obtaining the above product.

Simplifying the quotient digit selection logic has a further advantage of broadening the range of usable radixes for a still higher-speed division.

In order to obtain the product of any possible quotient digit under the specified radix and the divisor, a divider unit according to this invention is equipped with an addition/subtraction circuit having a plurality of inputs for operating three or more values expressed in the two's complement representation or equipped with a plurality of addition/subtraction circuits for operating values expressed in the redundant binary representation.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 1 is a table showing a divisor interval selection logic of a divider unit 100 according to the related art;

FIG. 2 is a table showing a quotient digit selection logic of the divider unit 100;

FIG. 4 is a table showing an example of bit allocation;

FIG. 5 is a table showing a partial remainder interval selection logic of a divider unit 200 according to a first embodiment of the present invention;

FIG. 6 is a table showing a range of the divisor D in each partial remainder interval concerning the divider unit 200;

FIG. 7 is a table showing a divisor interval selection logic of the divider unit 200;

FIG. 11 is a table showing operations of first and second divisor's multiple selection circuits 33 and 34 and an addition/subtraction circuit 37 of the divider unit 200;

FIGS. 12a and 12b and FIGS. 13a and 13b are tables showing a partial remainder interval selection logic of the divider unit 400 according to a second embodiment of the present invention;

FIGS. 14a and 14b are a table showing a range of the divisor D in each partial remainder interval concerning the divider unit 400;

FIGS. 15a and 15b FIGS. and 16a and 16b are tables showing a divisor interval selection logic of the divider unit 400;

FIG. 18 is a table showing operations of first and second divisor's multiple selection circuits 53 and 54 and first and second addition/subtraction circuits 55 and 57 of the divider unit 400;

FIG. 20 is a table showing an operation of a first addition cell 551i of the circuit 55;

FIG. 21 is a table showing an operation of a second addition cell 552i of the circuit 55;

FIG. 23 is a table showing an operation of a first addition cell 571i of the circuit 57;

FIG. 24 is a table showing an operation of a second addition cell 572i of the circuit 57;

FIGS. 26a and 26b are table showing a partial remainder interval selection logic of the divider unit 600;

FIGS. 27a and 27b are a table showing a range of the divisor D in each partial remainder interval concerning the divider unit 600;

FIGS. 28a and 28b are a table showing a divisor interval selection logic of the divider unit 600; and FIGS. 29a and 29b are a table showing operations of first and second divisor's multiple selection circuits 73 and 74 and an addition/subtraction circuit 77.

DESCRIPTION OF THE PREFERRED EMBODIMENTS

Embodiment I

Figure 3:
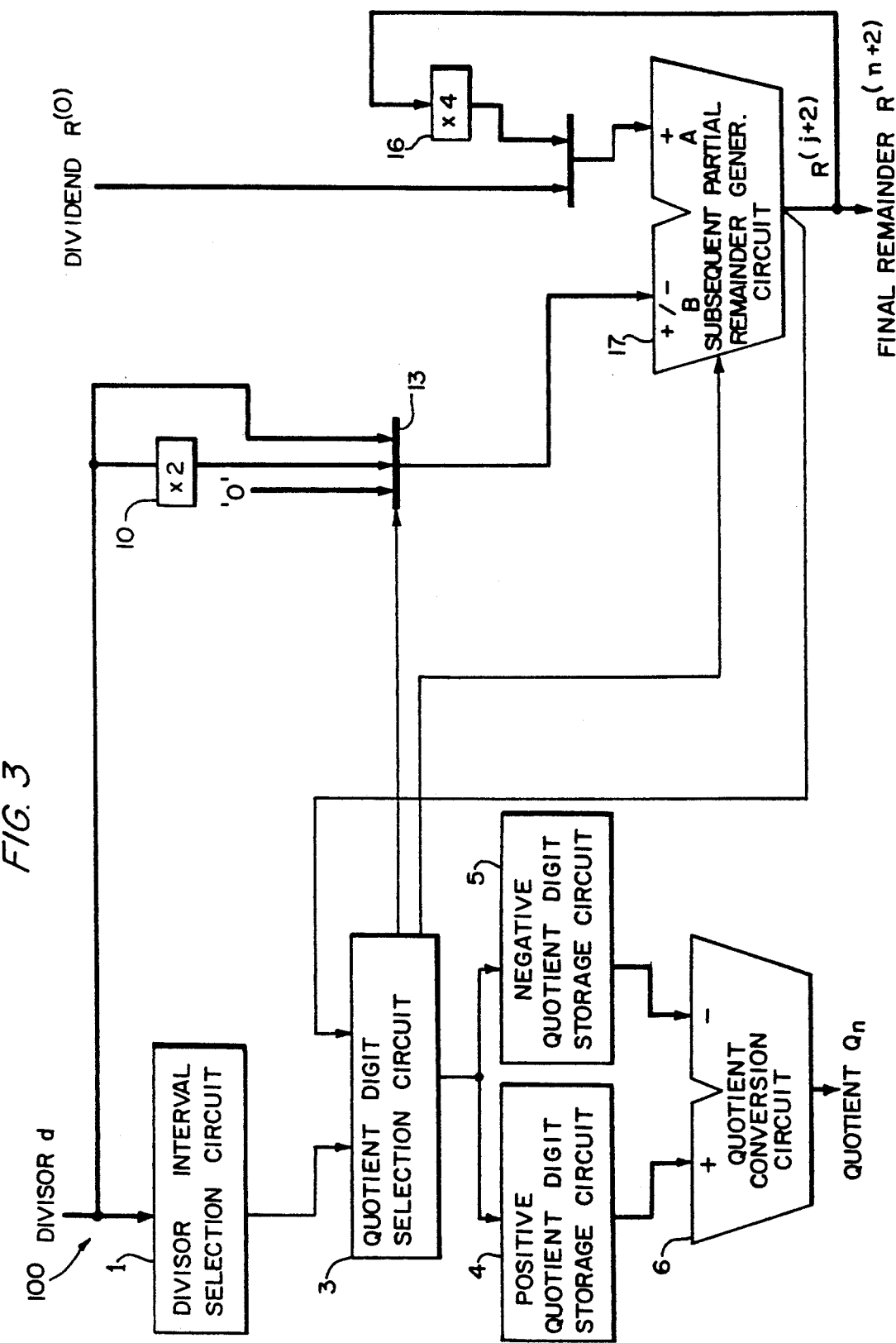
FIG. 3 is a block diagram of the divider unit 100.

As a first embodiment of the present invention, a divider unit 200 for obtaining a quotient $Q_n$ (to be obtained by dividing a dividend $R^{(0)}$ by a divisor D) and a value $R^{(n+2)}$ (to be obtained by multiplying a final remainder by $2^j$; j=a multiple of two) will be described. The quotient $Q_n$ has a bit length of n (n=a multiple of two) to the right of the binary point. $R^{(n+2)}$ will be referred to simply as the final remainder, hereinafter.

The following algorithm is a radix-4 case. In other words, the quotient $Q_n$ is obtained two digits by two digits. Each two digits are at the j-1'th and the j'th binary places in the binary representation and form a quotient digit $q_j$. A quotient from the first to the j'th binary places is referred to as $Q_j$.

A value obtained by multiplying a partial remainder by $2^j$ is represented by $R^{(j)}$. $R^{(j)}$ is used to obtain the quotient digit $q_j$ and will be referred to simply as the partial remainder, hereinafter. The value at the i'th binary place of the partial remainder $R^{(j)}$ is expressed as $r_i^{(j)}$ in the two's complement representation. A value at the i'th binary place of the divisor D is expressed by $d_i$. In summary, $$R^{(j)} = r_0^{(j)} \cdot r_1^{(j)} r_2^{(j)} r_3^{(j)} r_4^{(j)} \ldots$$

$$Q_j = q_0 \cdot q_2 q_4 \ldots q_j$$

$$D = 0 \cdot d_1 d_2 d_3 d_4 \ldots$$

where $r_0^{(j)}$ indicates a sign in the two's complement representation.

Figure 4:
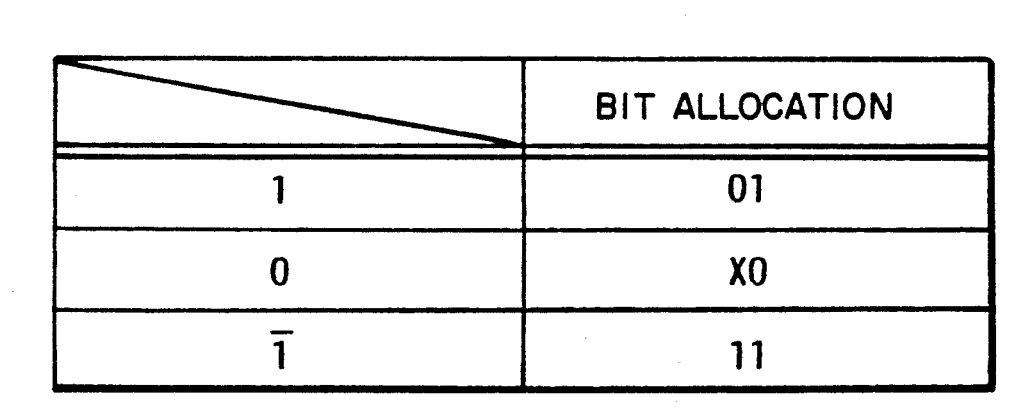

The quotient digit $q_j$ is expressed in the redundant binary representation. In other words, each digit in the binary representation is expressed by two bits: a sign bit and an absolute value bit. Arbitrary allocation is possible, one example of which is shown in FIG. 4. In FIG. 4 and hereinafter, X indicates that the value may be either 0 or 1, and each bar above the figure means the figure below the bar is negative. Each bar above the logical variable means logical NOT. <Step 1>

Normalize the dividend $R^{(0)}$ and the divisor D as follows:

---

<Step 1>
Normalize the dividend $R^{(0)}$ and the divisor D as follows:
  $2^{-1} \leq R^{(0)} < 1$
  $2^{-1} \leq D < 1$
If normalization has already been done, this step is not necessary.
<Step 2>
  $q_0 := [01]_2$;
  $Q_0 := q_0$;
  $R^{(2)} := R^{(0)} - q_0 \cdot D$;
<Step 3>
  for j:=2 to n+1 step 2 do
  begin
    Select a quotient digit $q_j$ in accordance with
    FIGS. 5 through 7.
    $R^{(j+2)} := 4R^{(j)} - q_j \cdot D$;
    $Q_j := Q_{j-2} + q_j \cdot 2^{-j}$;
  end
<Step 4>
  if $R^{(n+2)} < 0$ then
  begin
    $Q_n := Q_n - 2^{-n}$
    $R^{(n+2)} := R^{(n+2)} + D$;
  end
<Step 5>

---

Convert the quotient $Q_n$ into the two's complement representation.

The above description is conformed to the Pascal program language. ":=" is an operator indicating substitution, and "[...]$_2$" indicates the value in the bracket is expressed in the binary representation.

FIG. 5 shows a partial remainder interval selection logic for selecting one interval which the partial remainder $R^{(j)}$ belongs to out of a plurality of intervals bordered by specified values. Variables $R_4$, $R_3$, ... represent the operation results obtained by the logical expressions shown in FIG. 5. Only one of the variables in this figure is set to be 1.

FIG. 6 shows a range of the divisor D in each partial remainder interval. In FIG. 6 and hereinafter, each value in the parenthesis represents the theoretical border, and each value outside the parenthesis represents the border applicable in the corresponding embodiment. Each blank means there is no such divisor D that may yield the value of the quotient digit $q_j$ in the corresponding column. "(−)" in each $D_{min}$. column indicates a value less than ½, and "(−)" in each $D_{max}$. column indicates a value 1 or more. Practically, however, there is no necessity of considering such ranges because the divisor D has been normalized. Each range of the divisor D includes the $D_{min}$. value but exclude the $D_{max}$. value concerning both the theoretical borders and the borders applicable in this embodiment. When the partial remainder $R^{(j)}$ is negative, the sign of each quotient digit $q_j$ is inverted.

FIG. 7 shows a divisor interval selection logic for selecting one interval which the divisor D belongs to out of the intervals shown in FIG. 6. Variables $D_0(0)$, $D_1(1)$, etc. represent the operation results obtained by the logical expressions shown in FIG. 7. Only one variable is set to be 1 in each partial remainder interval. In other words, one of the logical products which are obtained by multiplying the variables $R_0$, ... and the variables $D_0(0)$, ... is set to be 1 and so selected as the quotient digit $q_j$.

It should be added that the above algorithm can be proved proper by the mathematical induction.

The divider unit 200 for executing the division using the above algorithm will be described referring to FIGS. 8 through 10.

Figure 8:
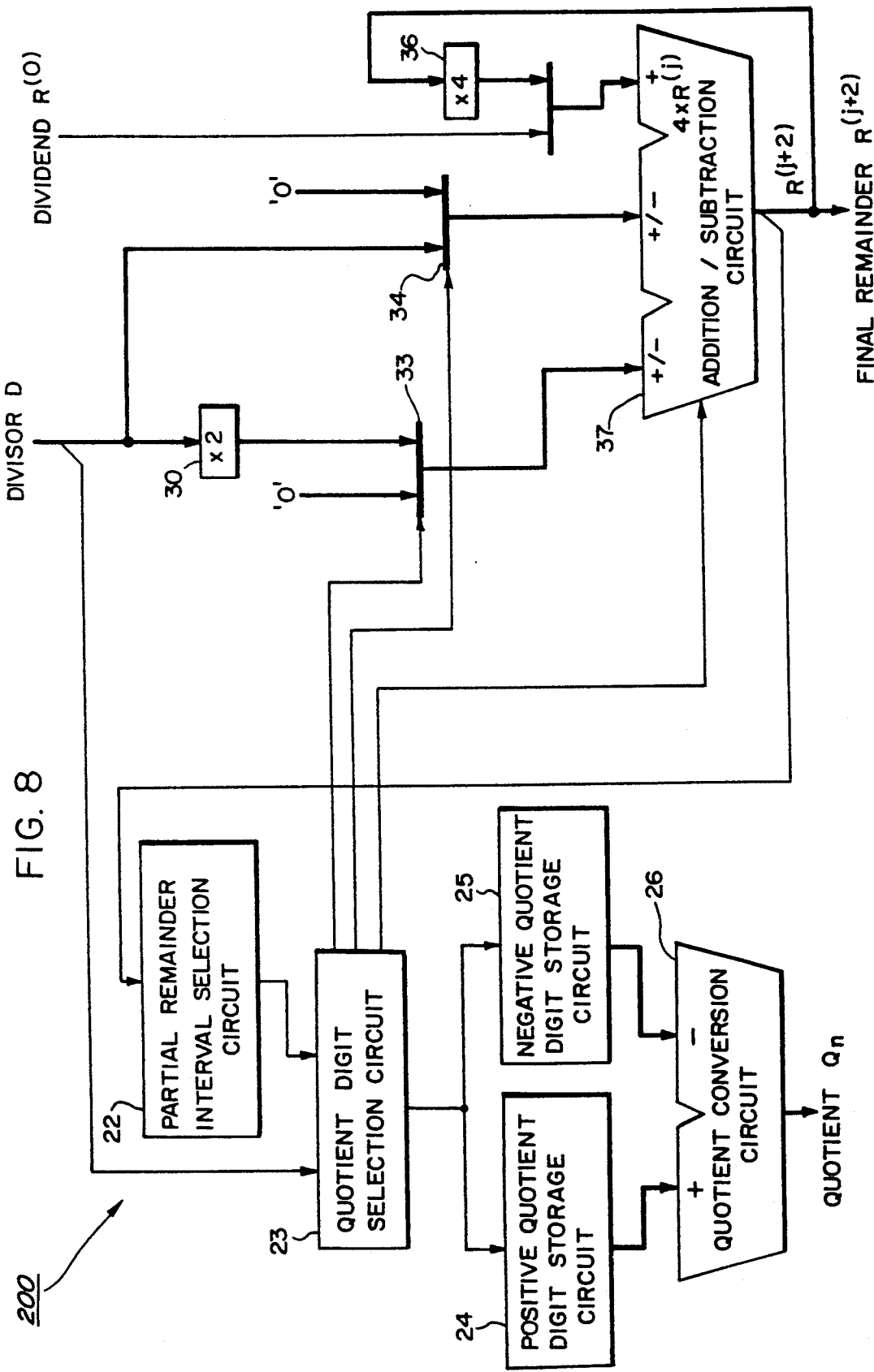
FIG. 8 is a block diagram of the divider unit 200.

FIG. 8 is a block diagram of the divider unit 200.

22 refers to a partial remainder interval selection circuit for selecting one interval which a partial remainder $R^{(j)}$ belongs to out of a plurality of intervals bordered by specified values, the selection being done based on $r_0^{(j)}$ through $r_3^{(j)}$ in accordance with FIG. 5. $r_0^{(j)}$ through $r_3^{(j)}$ are obtained from the partial remainder $R^{(j)}$ outputted by an addition/subtraction circuit 37 (will be described later in detail). $r_0^{(j)}$ is a sign of the partial remainder $R^{(j)}$, and $r_1^{(j)}$ through $r_3^{(j)}$ are values at the first through the third binary places of the partial remainder $R^{(j)}$.

23 refers to a quotient digit selection circuit for selecting one value as a quotient digit $q_j$ out of values −3, −2, −1, 0, 1, 2 and 3, of which absolute values are each represented in two bits. The selection is done based on the selection result of the circuit 22 and $d_2$ (the value at the second binary place of the divisor D) in accordance with FIG. 7. The circuit 23 is to output a value 1 as a quotient digit $q_0$ on an initial stage of the division. The circuit 23 is also to send a selection command to first and second divisor's multiple selection circuits 33 and 34 (will be described later in detail) and an addition/subtraction command to the circuit 37.

24 refers to a positive quotient digit storage circuit for storing the absolute value of the quotient digit $q_j$ if the quotient digit $q_j$ selected by the circuit 23 is positive and storing a value 0 if not. Either value is stored at a digit position corresponding to the loop in which the storage is executed.

25 refers to a negative quotient digit storage circuit for storing the absolute value of the quotient digit $q_j$ if the quotient digit $q_j$ is negative and storing the value 0 if not. Again, either value is stored at the digit position corresponding to the loop in which the storage is executed.

The circuits 24 and 25 each may be controlled to store the quotient digit $q_j$ at the lowest two bits thereof by a shift register and then to shift the stored value by two digits to the left.

26 refers to a quotient conversion circuit for subtracting the value of the circuit 25 from the value of the circuit 24, whereby to output the subtraction result as a quotient $Q_n$. The circuit 26 may be replaced with the addition/subtraction circuit 37.

30 refers to a divisor's double generation circuit for generating the double of the divisor D. The circuit 30 comprises, for instance, a shift register. The double of the divisor D may be generated loop by loop or in advance of the division.

The first divisor's multiple selection circuit 33 is for selectively outputting the double of the divisor D and 0 as a value A in response to the selection command from the circuit 23 in accordance with FIG. 11.

The second divisor's multiple selection circuit 34 is for selectively outputting the divisor D and 0 as a value B in response to the selection command from the circuit 23 in accordance with FIG. 11.

36 refers to a partial remainder's quadruple generation circuit for generating the quadruple of the partial remainder $R^{(j)}$ sent from the addition/subtraction circuit 37. (The quadruple of the partial remainder $R^{(j)}$ will be referred to as $4 \times R^{(j)}$, hereinafter.)

The addition/subtraction circuit 37 having three inputs for generating a subsequent partial remainder is to subtract the divisor D from the dividend $R^{(0)}$, both normalized by a normalization circuit (not shown), and output the subtraction result as a first partial remainder $R^{(2)}$ on the initial stage of the division. The circuit 37 is then to execute the operation shown in FIG. 11 using A, B and $4 \times R^{(j)}$, in response to the addition/subtraction command from the circuit 23. More precisely, if the quotient digit $q_j$ is positive, A-B is subtracted from $4 \times R^{(j)}$; and if the quotient digit $q_j$ is negative, A+B is added to $4 \times R^{(j)}$. A+B and A-B are each the product of the absolute value of the quotient digit $q_j$ and the divisor D.

Figure 9:
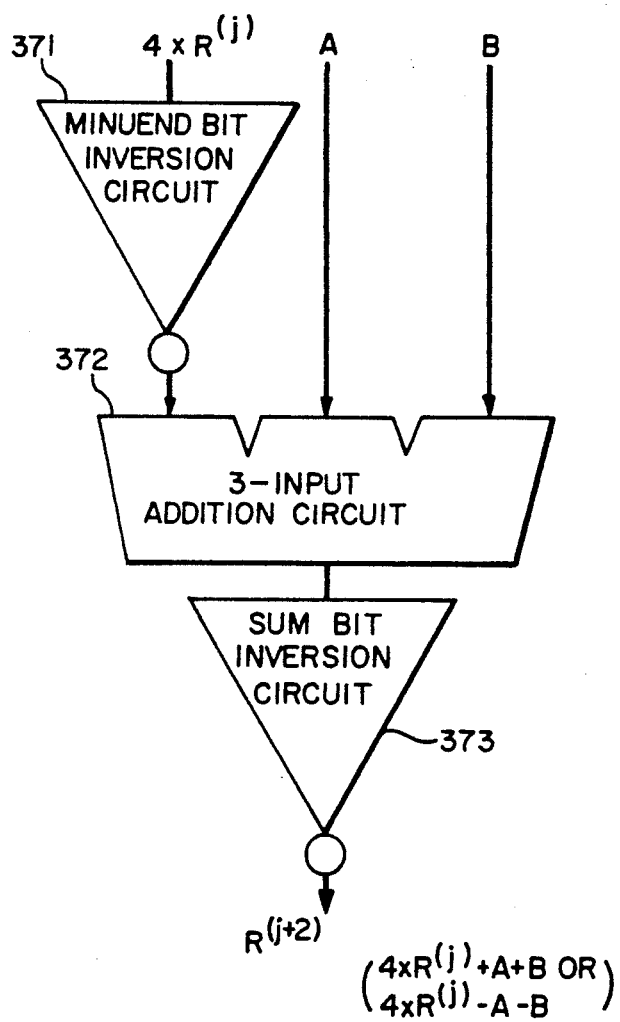
FIG. 9 is a view showing a construction of an addition/subtraction circuit 37.
Figure 10:
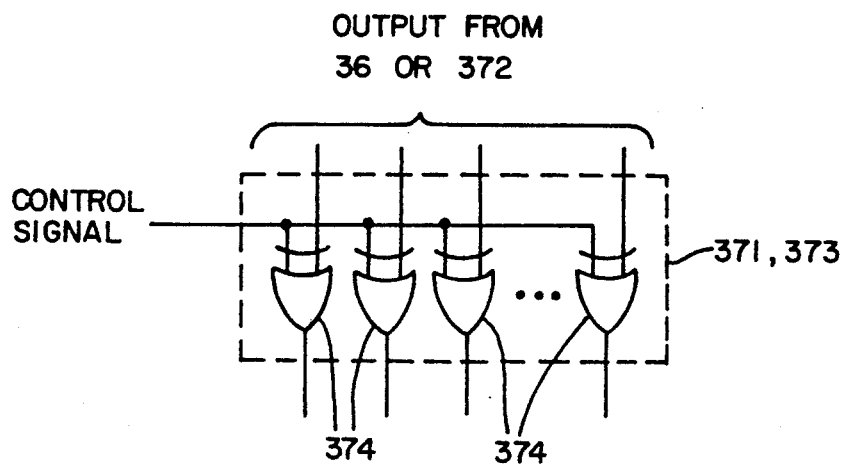
FIG. 10 is a view showing constructions of a minuend bit inversion circuit 371 and a sum bit inversion circuit 373.

As shown in FIG. 9, the addition/subtraction circuit 37 comprises a minuend bit inversion circuit 371, a 3-input addition circuit 372, and a sum bit inversion circuit 373. As shown in FIG. 10, the circuits 371 and 373 each comprise a plurality of XOR gates 374, which are controlled to execute $4 \times R^{(j)}{}_{+A+B}$ or $4 \times R^{(j)}{}_{-A-B}$ by a control unit (not shown).

The above circuits forming the divider unit 200 each comprise known AND, OR and NOT circuits for executing logical operations and so on shown in FIGS. 5, 7 and 11.

Practically, the divider unit 200 comprises other circuits including one for temporarily storing the partial remainder $R^{(j)}$ and one for counting the loops. Such circuits will not be described here because these circuits are not directly related to the gist of the present invention.

The divider unit 200 having the above construction executes the division in the following way.

1) When the normalized dividend $R^{(0)}$ and divisor D are inputted, the addition/subtraction circuit 37 subtracts the divisor D from the dividend $R^{(0)}$ and outputs the first partial remainder $R^{(2)}$. The quotient digit selection circuit 23 outputs the value 1 as the quotient digit $q_0$ (the value at ones place in the binary representation) and stores the above value 1 in the positive quotient digit storage circuit 24.

2) The partial remainder interval selection circuit 22 decodes $r_0^{(2)}$ through $r_3^{(2)}$ in accordance with FIG. 5, and then selects the interval which the divisor D belongs to. Since the partial remainder $R^{(2)}$ is expressed in the two's complement representation, there is no need for conversion from the redundant binary representation into the two's complement representation.

3) The quotient digit selection circuit 23 selects one of the values $-3, -2, -1, 0, 1, 2$ and 3 as a quotient digit $q_2$ based on the selection result of the circuit 22 and $d_2$ in accordance with FIG. 7.

4) On receiving the quotient digit $q_2$ from the circuit 23, the positive quotient digit storage circuit 24 stores the absolute value of the quotient digit $q_2$ at a digit position in the circuit 24 if the quotient digit $q_2$ is positive, the digit position corresponding to a first loop. If $q_2$ is not positive, the circuit 24 stores 0 at the same digit position.

On the contrary, the negative quotient digit storage circuit 25 stores the absolute value of the quotient digit $q_2$ at a digit position in the circuit 25 if the quotient digit $q_2$ is negative, the digit position corresponding to the first loop. If the quotient digit $q_2$ is not negative, the circuit 25 stores 0 at the same digit position.

5) The first divisor's multiple selection circuit 33 selectively outputs the double of the divisor D and 0 as the value A in response to the selection command from the circuit 23 in accordance with FIG. 11.

The second divisor's multiple selection circuit 34 selectively outputs the divisor D and 0 as the value B in response to the selection command from the circuit 23 in accordance with FIG. 11.

6) On receiving the addition/subtraction command from the circuit 23, the addition/subtraction circuit 37 executes the operation shown in FIG. 11 using A, B and $4 \times R^{(2)}$ sent from the circuit 36, whereby outputting a second partial remainder $R^{(4)}$. Then, the operation goes back to 2) for the next loop, wherein $R^{(4)}$ is used instead of $R^{(2)}$.

7) The above 2) to 6) is repeated n/2 times (the figures in binary places are counted as one) while incrementing each superscript and subscript by two. In this way, each quotient digit $q_j$ is obtained in the redundant binary representation, and the quotient digit $q_j$ is stored in the circuit 24 or 25 depending on the sign thereof. Then, a final remainder $R^{(n+2)}$ is outputted from the circuit 37.

8) The quotient conversion circuit 26 subtracts the value stored in the circuit 25 from the value stored in the circuit 24 and converts the subtraction result into the two's complement representation. If the final remainder $R^{(n+2)}$ is negative, the circuit 26 subtracts a value 1 at the lowest bit of the above subtraction result in the two's complement representation, whereby the quotient $Q_n$ is obtained. If necessary, the circuit 26 also adds the divisor D to the final remainder $R^{(n+2)}$ when $R^{(n+2)}$ is negative.

In the divider unit 200, although the generation logic of the divisor's multiple is complicated, the addition/- subtraction circuit 37 having three inputs contributes to keep the hardware quite compact and also to maintain short the time to generate the partial remainders. Moreover, the quotient digit selection logic is extremely simple. As a result, the divider unit 200 executes the operation of each loop in a shorter period of time than the other units employing the algorithms proposed by D. E. Atkins with approximately the same level of hardware.

In addition, accurate quotients and final remainders can be obtained without any errors which occur in the case of the convergence-type division.

If the divider unit 200 is applied to an apparatus equipped with an arithmetic processing unit such as a 3-input adding unit for calculating the number of floating-point numbers, the 3-input adding unit may also be used as the circuit 372. In such case, the hardware can still be more compact. If the divider unit 200 is applied to an apparatus equipped with a 2-input adding unit, the hardware of the 2-input adding unit may be extended a little to be a 3-input unit.

Embodiment II

As a second embodiment of the present invention, a divider unit 400 will be described in which a partial remainder $R^{(j)}$, as well as a quotient digit $q_j$, is expressed in the redundant binary representation in the radix-8 scheme.

The divider unit 400 employs the following algorithm, in which the value at the i'th binary place of the partial remainder $R^{(j)}$ is referred to as $r_i^{(j)}$ in the two's complement representation.

---

<Step 1>
Normalize a dividend $R^{(0)}$ and the divisor D as follows:
$2^{-1} \leq R^{(0)} < 1$
$2^{-1} \leq D < 1$
If normalization has already been done, this step is not necessary.
<Step 2>
$q_0 := [001]_2$;
$Q_0 := q_0$;
$R^{(3)} := R^{(0)} - q_0 \cdot D$;
<Step 3>
for j:=3 to n+1 step 3 do
begin
Select the quotient digit $q_j$ in accordance with FIGS. 12 through 16.
$R^{(j+3)} := 8R^{(j)} - q_j \cdot D$;
$Q_j := Q_{j-3} + q_j \cdot 2^{-j}$;
end
<Step 4>
if $R^{(n+3)} < 0$ then
begin
$Q_n := Q_n - 2^{-n}$
$R^{(n+3)} := R^{(n+3)} + D$;
end
<Step 5>

---

Convert the quotient $Q_n$ into the two's complement representation. If necessary, convert a final remainder $R^{(n+3)}$ into the two's complement representation.

FIGS. 12 and 13 show a partial remainder interval selection logic as mentioned in Embodiment I, concerning the partial remainder $R^{(j)}$ expressed in the two's complement representation.

Figure 14B:
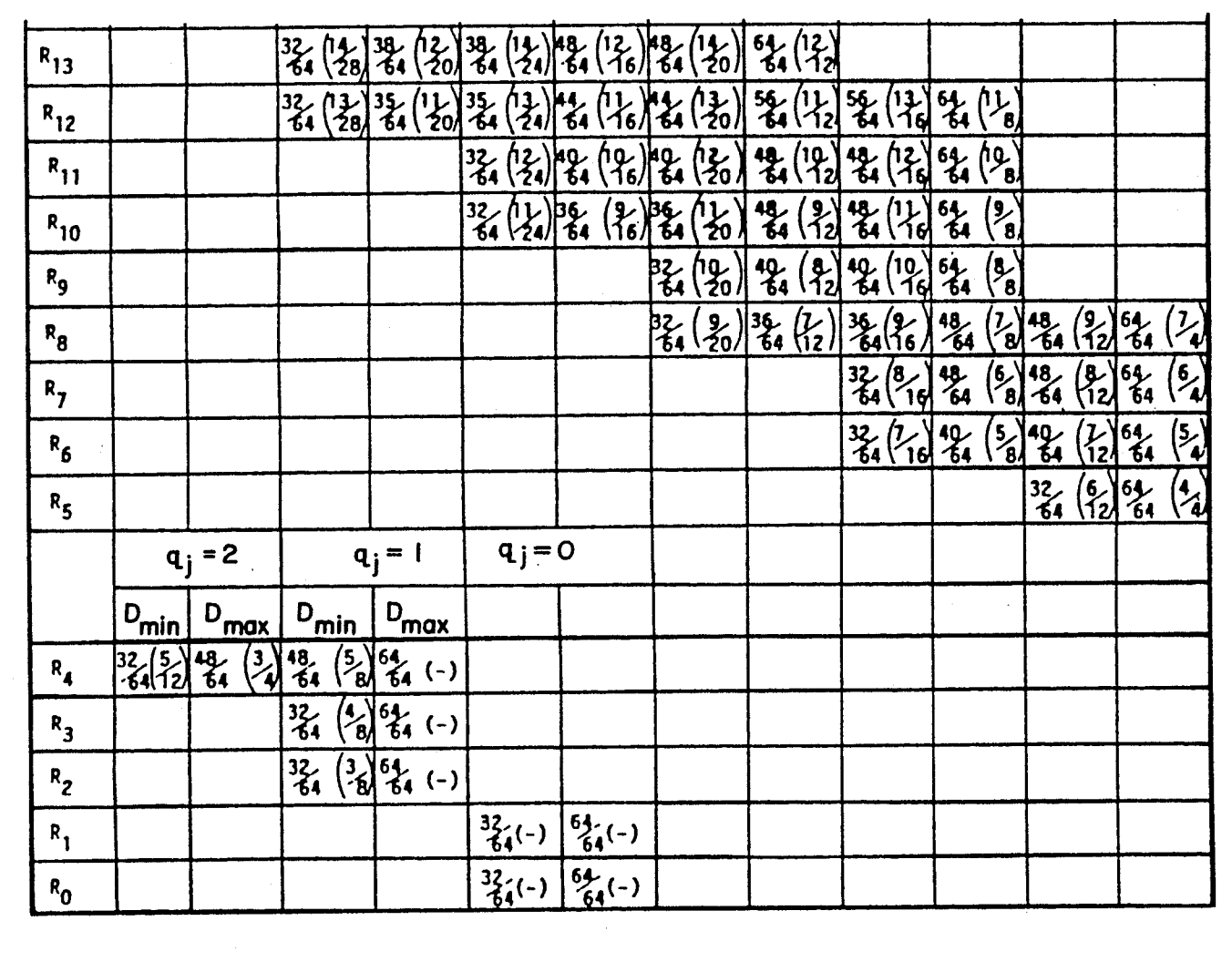

FIG. 14 shows a range of the divisor D in each partial remainder interval. FIGS. 15 and 16 show a divisor interval selection logic as mentioned in Embodiment I. Same definitions are applied to FIGS. 12 through 16 as to FIGS. 5 through 7. In FIG. 14, however, each range of the divisor D includes both the $D_{min}$ and $D_{max}$ values concerning the theoretical borders. Concerning the borders applicable in this embodiment, each range includes the $D_{min}$ value but excludes the $D_{max}$ value.

The divider unit 400 for executing the division using the above algorithm will be described referring to FIGS. 17 through 24.

Figure 17:
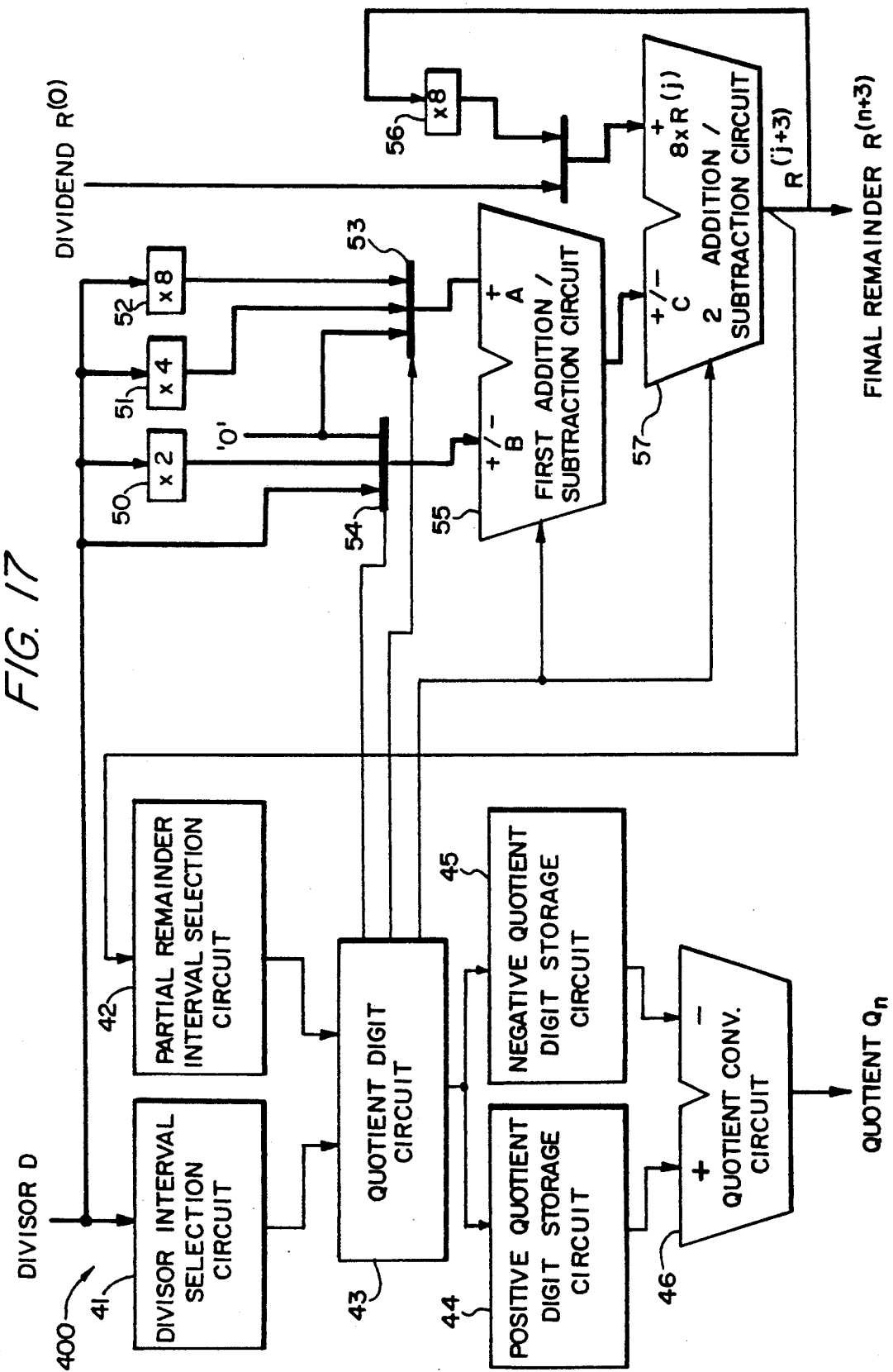
FIG. 17 is a block diagram of the divider unit 400.

FIG. 17 is a block diagram of the divider unit 400.

41 refers to a divisor interval selection circuit for selecting one interval which the divisor D belongs to out of a plurality of intervals bordered by specified values, the selection being done based on $d_2$ through $d_6$ in accordance with FIGS. 15 and 16.

42 refers to a partial remainder interval selection circuit for converting the upper five digits of a partial remainder $R^{(j)}$ expressed in the redundant binary representation (sent from an addition/subtraction circuit 57 which will be described later in detail) into the two's complement representation and selecting one interval which the partial remainder $R^{(j)}$ belongs to out of a plurality of intervals bordered by specified values, the selection being done based on $r_0^{(j)}$ through $r_5^{(j)}$ in accordance with FIGS. 12 and 13. $R_0^{(j)}$ is a sign of the partial remainder $R^{(j)}$, and $r_1^{(j)}$ through $r_5^{(j)}$ are values at the first to the fifth binary places of the partial remainder $R^{(j)}$.

43 refers to a quotient digit selection circuit for selecting one value as the quotient digit $q_j$ out of values $-7, -6, -5, -4, -3, -2, -1, 0, 1, 2, 3, 4, 5, 6$ and $7$, of which absolute values are each represented in three bits. The selection is done based on the selection result of the circuits 41 and 42 in accordance with FIGS. 15 and 16. The circuit 43 is to output a value 1 as a quotient digit $q_0$ on an initial stage of the division. The circuit 43 is also to send a selection command and an addition/subtraction command to first and second divisor's multiple selection circuits 53 and 54 (will be described later in detail) and the circuit 57.

44 and 45 refer to positive and negative quotient digit storage circuits, respectively, which correspond to the circuits 24 and 25 in Embodiment I.

46 refers to a quotient conversion circuit corresponding to the circuit 26 in Embodiment I.

50, 51 and 52 refer to divisor's double, quadruple and octuple generation circuits for generating the double, the quadruple and the octuple of the divisor D, respectively. The double, the quadruple and the octuple of the divisor D will be referred to 2xD, 4xD and 8xD respectively hereinafter.

The first divisor's multiple selection circuit 53 is for selectively outputting the quadruple and the octuple of the divisor D and 0 as a value A in response to the selection command from the circuit 43 in accordance with FIG. 18.

The second divisor's multiple selection circuit 54 is for selectively outputting the double of the divisor D, the divisor D and 0 as a value B in response to the selection command from the circuit 43 in accordance with FIG. 18.

55 refers to a first addition/subtraction circuit having two inputs for generating a divisor's multiple. The circuit 55 is to execute the operation shown in FIG. 18 using the values A and B in response to the addition/-subtraction command from the circuit 43, whereby to generate a product C (A+B or A-B) of the absolute value of the quotient digit $q_j$ and the divisor D. The product C is expressed in the redundant binary representation. The product C may be generated loop by loop, or a plurality of possible products may be generated in advance. In the latter case, when the value of the quotient digit $q_j$ is determined, one of the products is selected. In FIG. 18, I indicates either addition or subtraction is acceptable.

Figure 19:
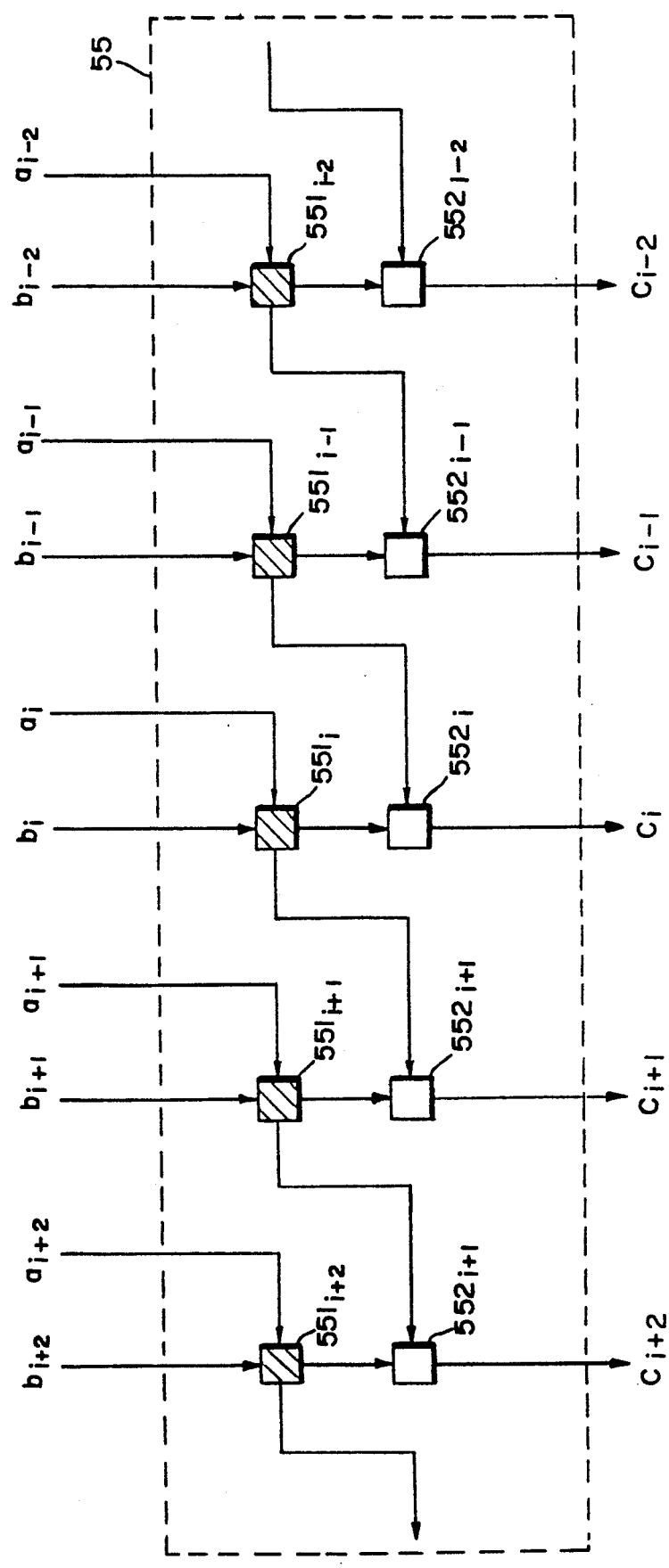
FIG. 19 is a view showing a construction of the first addition/subtraction circuit 55.

The first addition/subtraction circuit 55 has a construction shown in FIG. 19.

551$i$ refers to a first addition cell for operating values $a_i$ and $b_i$ at the i'th digit of the values A and B in accordance with FIG. 20, whereby to output an intermediate carry and an intermediate sum. In FIG. 20, the value to the left of "," is the intermediate carry and the value to the right thereof is the intermediate sum.

552$i$ refers to a second addition cell for operating the intermediate sum outputted by the first addition cell 551$_i$ and the intermediate carry outputted by the first addition cell 551$_{i-1}$ in accordance with FIG. 21 and outputting the operation result as a value $c_i$ in the redundant binary representation. In FIG. 21, the value in each box indicates the value of $c_i$, and " " indicates the combination of the intermediate carry and the intermediate sum is impossible.

The circuit 55 executes addition and subtraction using positive binaries in the redundant binary scheme. Accordingly, the operation rules can be simple, which simplifies the construction of the circuit 55. Since carry and borrow are propagated to the upper digit only by one, the operation time does not depend on the bit length of the divisor D and so is shortened.

56 refers to an partial remainder's octuple generation circuit for generating the octuple of the partial remainder $R^{(j)}$ (the octuple will be referred to as $8xR^{(j)}$) sent from the circuit 57.

The second addition/subtraction circuit 57 having two inputs for generating a subsequent partial remainder is to subtract the divisor D from the dividend $R^{(0)}$, both normalized by a normalization circuit (not shown), and output the subtraction result as a first partial remainder $R^{(3)}$ on the initial stage of the division. The circuit 57 is then to execute the operation shown in FIG. 18 using the product C and $8xR^{(j)}$ in response to the addition/subtraction command from the circuit 43. More precisely, if the quotient digit $q_j$ is positive, the product C is subtracted from $8xR^{(j)}$; and if the quotient digit $q_j$ is negative, the product C is added to $8xR^{(j)}$.

Figure 22:
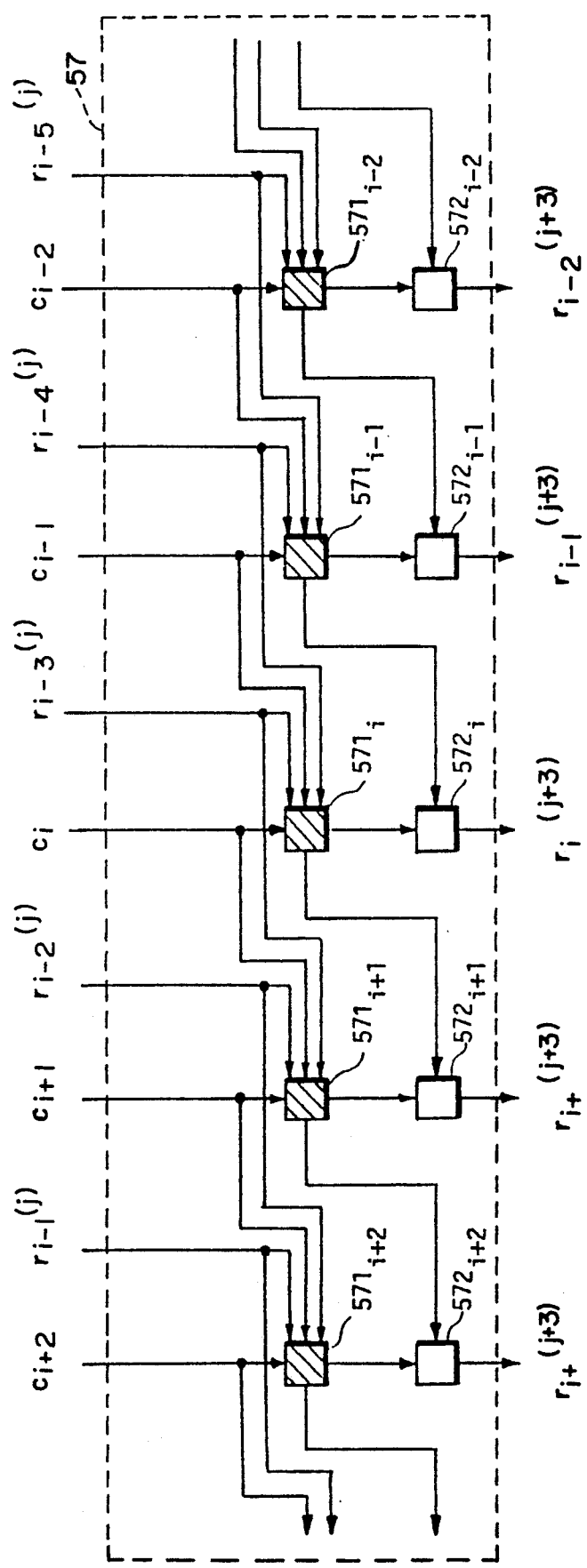
FIG. 22 is a view showing a construction of the second addition/subtraction circuit 57.

The second addition/subtraction circuit 57 has a construction shown in FIG. 22.

571$i$ refers to a first addition cell for operating values $c_i$ and $r_{i-3}$ at the i'th digit of the product C and of $8xR^{(j)}$ in accordance with FIG. 23, whereby to output an intermediate carry and an intermediate sum. In FIG. 23, the value to the left of "," is the intermediate carry and the value to the right thereof is the intermediate sum.

572$i$ refers to a second addition cell for operating the intermediate sum outputted by the first addition cell 571$_i$ and the intermediate carry outputted by the first addition cell 571$_{i-1}$ in accordance with FIG. 24 with the same operation rules of FIG. 21 and outputting the operation result as the partial remainder $R^{(j+3)}$ in the redundant binary representation.

The circuit 57 executes addition and subtraction using positive and negative binaries in the redundant binary scheme. However, since carry and borrow are propagated to the upper digit only by two, the operation time does not depend on the bit length of the divisor D and so is shortened.

The divider unit 400 having the above construction executes the division in the following way.

1) When the normalized dividend $R^{(0)}$ and divisor D are inputted, the second addition/subtraction circuit 57 subtracts the divisor D from the dividend $R^{(0)}$ and outputs the first partial remainder $R^{(3)}$. The quotient digit selection circuit 43 outputs the value 1 as the quotient digit $q_0$ (the value at ones place in the binary representation) and stores the above value 1 in the positive quotient digit storage circuit 44.

2) The divisor interval selection circuit 41 decodes $d_2$ through $d_6$ in accordance with FIGS. 15 and 16, whereby to select the interval which the divisor D belongs to. Such selection is done only once on the initial stage of the division, and the result is retained until the division is finished. $d_2$ through $d_6$ are values at the second through the sixth binary places of the divisor D.

3) The partial remainder interval selection circuit 42 converts the upper five digits of the partial remainder $R^{(3)}$ into the two' complement representation and decodes $r_1^{(3)}$ through $r_5^{(3)}$ in accordance with FIGS. 12 and 13, and then selects the interval which the partial remainder $R^{(3)}$ belongs to.

4) The quotient digit selection circuit 43 selects one of the values $-7, -6, -5, -4, -3, -2, -1, 0, 1, 2, 3, 4, 5, 6$ and $7$ as a quotient digit $q_3$ based on the selection results of the circuit 41 and 42 in accordance with FIGS. 15 and 16.

5) On receiving the quotient digit $q_3$ from the circuit 43, the positive quotient digit storage circuit 44 stores the absolute value of the quotient digit $q_3$ at a digit position in the circuit 44 if the quotient digit $q_3$ is positive, the digit position corresponding to a first loop. If $q_3$ is not positive, the circuit 44 stores 0 at the same digit position.

On the contrary, the negative quotient digit storage circuit 45 stores the absolute value of $q_3$ at a digit position in the circuit 45 if $q_3$ is negative, the digit position corresponding to the first loop. If the quotient digit $q_j$ is not negative, the circuit 45 stores 0 at the same digit position.

6) The first divisor's multiple selection circuit 53 selectively outputs the octuple and the quadruple of the divisor D and 0 as a value A in response to the selection command from the circuit 43 in accordance with FIG. 18.

The second divisor's multiple selection circuit 54 selectively outputs the double of the divisor D, the divisor D and 0 as a value B in response to the selection command from the circuit 43 in accordance with FIG. 18.

7) On receiving the addition/subtraction command from the circuit 43, the first addition/subtraction circuit 55 executes the operation shown in FIG. 18 using A and B, whereby outputting the product C of the absolute value of the quotient digit $q_3$ and the divisor D.

8) On receiving the addition/subtraction command from the circuit 43, the second addition/subtraction circuit 57 executes the operation shown in FIG. 18 using the product C and $8xR^{(j)}$, whereby outputting a second partial remainder $R^{(6)}$. Then, the operation goes back to 2) for the next loop, wherein $R^{(6)}$ is used instead of $R^{(3)}$.

9) The above 2) to 8) is repeated n/3 times (the figures in binary places are counted as one) while incrementing each superscript and subscript by three. In this way, each quotient digit $q_j$ is obtained in the redundant binary representation, and the quotient digit $q_j$ is stored in the circuit 44 or 45 depending on the sign thereof. Then, a final remainder $R^{(n+3)}$ is outputted from the circuit 57.

10) The quotient conversion circuit 46 subtracts the value stored in the circuit 45 from the value stored in the circuit 44 and converts the subtraction result into the two's complement representation. If the final remainder $R^{(n+3)}$ is negative, the circuit 46 subtracts a value 1 at the lowest bit of the above subtraction result in the two's complement representation, whereby the quotient $Q_n$ is obtained. If necessary, the circuit 46 converts the final remainder $R^{(n+3)}$ into the two's complement representation in the same manner by a final remainder compensation circuit (not shown). If necessary, the circuit 46 also adds the divisor D to the final remainder $R^{(n+3)}$ when $R^{(n+3)}$ is negative.

In the above divider unit 400, the quotient digit selection logic is extremely simple. Accordingly, the radix-8 scheme is employed while keeping the hardware compact, and also the times the operation of the loop is repeated can be reduced to $\frac{1}{3}$ of the conventional divider units designed for the radix-2 SRT division and the nonrestoring division.

The partial remainder is obtained through two-step addition/subtraction by the circuits 55 and 57. However, since the operation is done in the redundant binary scheme, the time delay is small enough to realize a high-speed operation.

Embodiment III

As a third embodiment of this invention, a divider unit 600 will be described in which a partial remainder $R^{(j)}$ is expressed in the two's complement representation in the radix-8 scheme.

Figure 25:
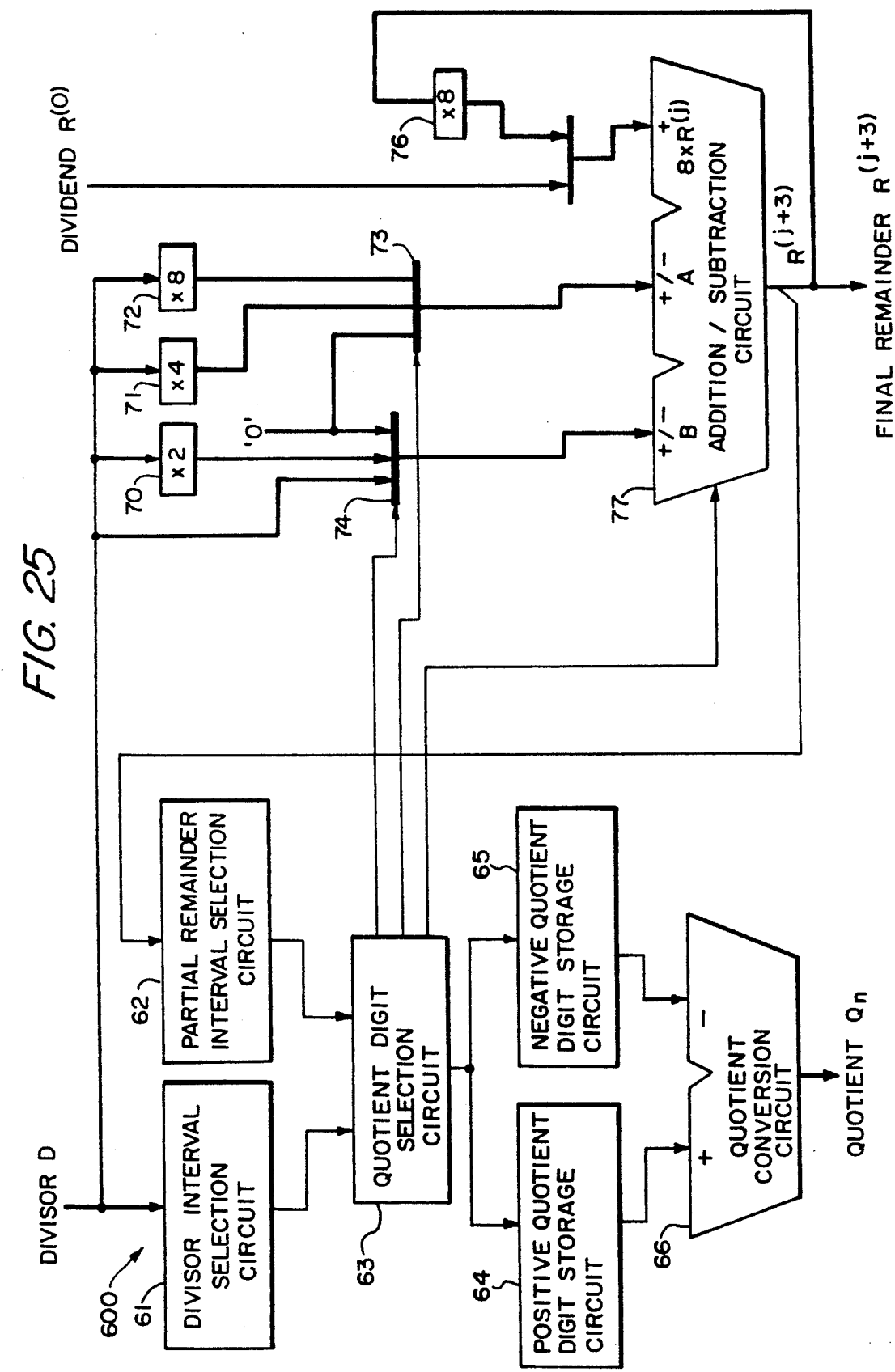
FIG. 25 is a block diagram of the divider unit 600 according to a third embodiment of this invention.

FIG. 25 shows a block diagram of the divider unit 600.

64 and 65 are positive and negative quotient digit storage circuits, respectively. 66 is a quotient conversion circuit. 70, 71 and 72 are divisor's double, quadruple and octuple generation circuits, respectively. 73 and 74 are first and second divisor's multiple selection circuits, respectively. 76 is a partial remainder's octuple generation circuit. The circuits 64, 65, 66, 70, 71, 72, 73, 74 and 76 correspond to counterparts thereof of Embodiment II and will not be described in Embodiment III.

61 refers to a divisor interval selection circuit for selecting one interval which the divisor D (shown in FIG. 27) belongs to in the same manner as the circuit 41 of Embodiment II in accordance with FIG. 28. In FIG. 27, each range of the divisor D excludes the $D_{min.}$ and the $D_{max.}$ values concerning the theoretical borders. Concerning the borders applicable to this embodiment, each range includes the $D_{min.}$ value but excludes the $D_{max.}$ value.

62 refers to a partial remainder selection circuit for selecting one interval which the partial remainder $R^{(j)}$ belongs to in the same manner as the circuit 22 of Embodiment I in accordance with FIG. 26.

63 refers to a quotient digit selection circuit for selecting one of values $-7, -6, -5, -4, -3, -2, -1, 0, 1, 2, 3, 4, 5, 6$ and $7$ as a quotient digit $q_j$ in the same manner as the circuit 43 of Embodiment II in accordance with FIG. 28.

The circuits 73 and 74 and an addition/subtraction circuit 77 having three inputs for generating a subsequent partial remainder are for executing the operation shown in FIGS. 29, whereby to execute addition or subtraction using $8 \times R^{(j)}$, A and B.

In the divider unit 600 having the above construction, the division is executed with the same algorithm as that of Embodiment II. Owing to the radix-8 scheme used in this unit, the times the operation of the loop is repeated is reduced as in Embodiment II. Moreover, the time required for the quotient digit selection is shorter than in Embodiment II despite the use of a radix-8 scheme. As a result, the division processing speed is remarkably enhanced.

In Embodiments I, II and III, the dividend and the divisor are normalized in the range of $\frac{1}{2}$ or more but less than 1. However, the normalization number can be set as $2^{k-1} <$ normalization number $\leq 2^k$, where k is an arbitrary integer. If $1 \leq$ normalization number $< 2$, for instance, the position of the binary point in the case of $\frac{1}{2} \leq$ normalization number $< 1$ is shifted to the lower bit or digit by one. In such case, the bit position described in the above embodiments appears to be shifted to the upper bit or digit by one. In other words, multiplying the dividend and the divisor by the same value leads to the same quotient. That is why the position of the binary point and the value of k are not essential in the above division procedure.

Although the dividend and the divisor are normalized, the dividend should not necessarily normalized. Accordingly, integer division can be executed by adding a circuit for normalizing the divisor and a circuit for adjusting digits to the divider unit according to this invention.

When the absolute value of the dividend is smaller than the divisor, a value 1 may be outputted as a first quotient digit $q_0$ while outputting the dividend as a first partial remainder.

The logical expressions mentioned in this specification may be modified based on various logical operation rules.

Although the present invention has been fully described by way of the embodiments with references to the accompanying drawings, it is to be noted that various changes and modifications will be apparent to those skilled in the art. Therefore, unless such changes and modifications depart from the scope of the present invention, they should be construed as being included therein.

What is claimed is:

1. A divider unit for executing a high radix division using a partial remainder expressed in a two's complement representation, said unit comprising:

quotient digit selection means for selecting one quotient digit out of all quotient digits obtainable under a radix value of an applied radix based on values of a part of upper digits of a divisor, on values of a part of upper digits of a partial remainder, and on a sign of the partial remainder;

a plurality of divisor's multiple generating means, each for generating at least one of a value 0 and another value obtained by multiplying the divisor with $2^j$, where j is an integer;

multiplication means for generating a first product of the partial remainder and the radix value; and adding and subtracting means having at least three inputs for selectively executing an addition and a subtraction using the first product and at least two of the values generated by said divisor's multiple generating means to generate an equivalent of one of an addition and a subtraction of the first product on one hand and a second product of the divisor and the one quotient digit on another hand to generate another partial remainder in the two's complement representation.

2. A divider unit of claim 1, wherein said adding and subtracting means comprises:
first bit inverting means for inverting all bits of a minuend;
adding means for adding an output from said first bit inverting means and a subtrahend; and
second bit inverting means for inverting all bits of an output from said adding means.

3. A divider unit of claim 1, as applied to a data processing apparatus, wherein said adding and subtracting means is an arithmetic processing unit of the data processing apparatus, the arithmetic processing unit capable of performing mathematical operations other than division.

4. A divider unit for executing a high radix division using a partial remainder expressed in a redundant binary representation, said unit comprising:
quotient digit selecting means for selecting one quotient digit out of all quotient digits obtainable under a radix value of an applied radix based on values of a part of upper digits of a divisor and on values of a part of upper digits of a partial remainder;
a plurality of divisor's multiple generating means, each for generating at least one of a value 0 and another value obtained by multiplying the divisor with $2^j$, where j is an integer;
multiplication means for generating a first product of the partial remainder and the radix value;
first adding and subtracting means for selectively executing an addition and a subtraction using the values generated by said divisor's multiple generating means to generate a second product of the one quotient digit selected by said quotient digit selecting means and the divisor, the product being expressed in the redundant binary representation; and
second adding and subtracting means for selectively executing an addition and a subtraction using the first product and the second product to generate another partial remainder in the redundant binary representation.

5. A divider unit for executing a radix-8 division, said unit comprising:
partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;
divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;
quotient digit selecting means for generating a value 1 as a first quotient digit on an initial stage of a division, and thereafter selecting a second quotient digit from $-7, -6, -5, -4, -3, -2, -1, 0, 1, 2, 3, 4, 5, 6$ and 7 in accordance with a combination of the partial remainder interval and the divisor interval;
divisor's multiple generating means for generating a first product of the second quotient digit and the normalized divisor;
multiplication means for generating a second product equal to an octuple of the primary partial remainder in a two's complement representation; and
subsequent partial remainder generating means for subtracting the normalized divisor from a normalized dividend and outputting the subtraction result as an initial partial remainder in the two's complement representation on the initial stage of the division, and thereafter subtracting the first product from the second product and outputting the subtraction result as a secondary partial remainder in the two's complement representation.

6. A divider unit of claim 5, wherein the normalized divisor and the normalized dividend are both in the range of ½ at the minimum but less than 1.

7. A divider unit of claim 5, wherein the normalized divisor and the normalized dividend are both in the range of 1 at the minimum but less than 2.

8. A divider unit for executing a radix-8 division, said unit comprising:
partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;
divisor interval selecting means for selecting a divisor interval to which a normalized divisor belongs out of a plurality of intervals obtained by dividing a range of the normalized divisor using specified constants as borders, the above selection being done using five bits at a second binary plate and to the right thereof of the normalized divisor;
quotient digit selecting means for generating a value 1 as a first quotient digit on an initial stage of a division, and thereafter selecting a second quotient digit from $-7, -6, -5, -4, -3, -2, -1, 0, 1, 2, 3, 4, 5, 6$ and 7 in accordance with a combination of the partial remainder interval and the divisor interval;
divisor's multiple generating means for generating a first product of the absolute value of the second quotient digit and the normalized divisor;
multiplication means for generating a second product equal to an octuple of the primary partial remainder in a two's complement representation; and
subsequent partial remainder generating means for subtracting the normalized divisor from a normalized dividend and outputting the subtraction result as an initial partial remainder of the two's complement representation on the initial stage of the division, and thereafter subtracting the first product from the second product when the second quotient digit is positive and adding the first product and the second product when the second quotient digit is negative, the subtraction and addition results being outputted as a secondary partial remainder in the two's complement representation.

9. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;

quotient digit selecting means for generating a value 1 as a first quotient digit on an initial stage of a division, and thereafter selecting a second quotient digit from $-7, -6, -5, -4, -3, -2, -1, 0, 1, 2, 3, 4, 5, 6$ and 7 in accordance with a combination of the partial remainder interval and the divisor interval;

divisor's multiple generating means for generating multiples of the normalized divisor with multipliers 2 through 7 on the initial stage of the division;

divisor's multiple selecting means for generating a first product of the absolute value of the quotient digit and the normalized divisor by selecting one of a value 0, the normalized divisor and the above multiples in accordance with the absolute value of the second quotient digit;

multiplication means for generating a second product equal to an octuple of the primary partial remainder in a two's complement representation; and subsequent partial remainder generating means for subtracting the normalized divisor from a normalized dividend and outputting the subtraction result as an initial partial remainder in the two's complement representation on the initial stage of the division, and thereafter subtracting the first product from the second product when the second quotient digit is positive and adding the first product and the second product when the second quotient digit is negative, the subtraction and addition results being outputted as a secondary partial remainder in a two's complement representation.

10. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder, the primary partial remainder being expressed by R;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor, the normalized divisor being expressed by D;

quotient digit selecting means for generating a value 1 as a first quotient digit on an initial stage of a division, and thereafter selecting a second quotient digit from $-7, -6, -5, -4, -3, -2, -1, 0, 1, 2, 3, 4, 5, 6$, and 7 in accordance with a combination of the partial remainder interval and the divisor interval;

divisor's double generating means for generating the double of the normalized divisor 2D;

divisor's quadruple generating means for generating the quadruple of the normalized divisor 4D;

divisor's octuple generating means for generating the octuple of the normalized divisor 8D; and adding and subtracting means having three inputs for generating a secondary partial remainder, said adding and subtracting means subtracting the normalized divisor from a normalized dividend and outputting the subtraction result as an initial partial remainder in a two's complement representation on the initial stage of the division, and thereafter outputting values obtained by $R-D+8D$, $R+2D+4D$, $R+D+4D$, $R+4D$, $R-D+4D$, $R+2D$, $R+D$, $R$, $R-D$, $R-2D$, $R+D-4D$, $R-4D$, $R-D-4D$, $R-2D-4D$ and $R+D-8D$ when the second quotient digit is $-7, -6, -5, -4, -3, -2, -1, 0, 1, 2, 3, 4, 5, 6$ and 7, respectively the above values each being outputted as the secondary partial remainder in the two's complement representation.

11. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;

quotient digit selecting means for generating a quotient digit from $-7, -6, -5, -4, -3, -2, -1, 0, 1, 2, 3, 4, 5, 6$ and 7 in accordance with a combination of the partial remainder interval and the divisor interval;

divisor's multiple generating means for generating a first product of the quotient digit and the normalized divisor;

multiplication means for generating a second product equal to an octuple of the primary partial remainder in a two's complement representation; and subsequent partial remainder generating means for outputting a dividend as an initial partial remainder when the absolute value of the dividend is smaller than the divisor on the initial stage of the division, and thereafter subtracting the first product from the second product and outputting the subtracting result as a secondary partial remainder in the two's complement representation.

12. A divider unit of claim 11, wherein the normalized divisor is in the range of ½ at the minimum but less than 1.

13. A divider unit of claim 11, wherein the normalized divisor is in the range of 1 at the minimum but less than 2.

14. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;

quotient digit selecting means for generating a quotient digit from $-7, -6, -5, -4, -3, -2, -1, 0, 1, 2, 3, 4, 5, 6$ and $7$ in accordance with a combination of the partial remainder interval and the divisor interval;

divisor's multiple generating means for generating a first product of the quotient digit and the normalized divisor;

multiplication means for generating a second product equal to an octuple of the primary partial remainder in a two's complement representation; and subsequent partial remainder generating means for outputting a dividend as an initial partial remainder when the absolute value of the dividend is smaller than the normalized divisor on the initial stage of the division, and thereafter subtracting the first product from the second product when the quotient digit is positive and adding the first product and the second product when the quotient digit is negative, the subtraction and addition results being outputted as a secondary partial remainder in the two's complement representation.

15. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;

quotient digit selecting means for generating a quotient digit from $-7, -6, -5, -4, -3, -2, -1, 0, 1, 2, 3, 4, 5, 6$ and $7$ in accordance with a combination of the partial remainder interval and the divisor interval;

divisor's multiple generating means for generating multiples of the normalized divisor with multipliers 2 through 7 on the initial stage of the division;

divisor's multiple selecting means for generating a first product of the absolute value of the quotient digit and the normalized divisor by selecting one of a value 0, the normalized divisor and the above multiples in accordance with the absolute value of the quotient digit;

multiplication means for generating a second product equal to an octuple of the primary partial remainder in a two's complement representation; and subsequent partial remainder generating means for outputting a dividend as an initial partial remainder when the absolute value of the dividend is smaller than the normalized divisor on the initial stage of the division, and thereafter subtracting the first product from the second product when the quotient digit is positive and adding the first product and the second product when the quotient digit is negative, the subtraction and addition results being outputted as s secondary partial remainder in the two's complement representation.

16. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder, the primary partial remainder being expressed by R;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor, the normalized divisor being expressed by D;

quotient digit selecting means for generating a quotient digit from $-7, -6, -5, -4, -3, -2, -1, 0, 1, 2, 3, 4, 5, 6$ and $7$ in accordance with a combination of the partial remainder interval and the divisor interval;

divisor's multiple generating means for generating the double of the normalized divisor 2D;

divisor's quadruple generating means for generating the quadruple of the normalized divisor 4D;

divisor's octuple generating means for generating the octuple of the normalized divisor 8D; and adding and subtracting means having three inputs for generating a secondary partial remainder, said adding and subtracting means outputting a dividend as an initial partial remainder when the absolute value of the dividend is smaller than the normalized divisor on the initial stage of the division, and thereafter outputting values obtained by $R-D+8D$, $R+2D+4D$, $R+D+4D$, $R+4D$, $R-D+4D$, R+2D, R+D, R, R−D, R−2D, R+D−4D, R−4D, R−D−4D, R−2D−4D, and R+D−8D when the quotient digit is −7, −6, −5, −4, −3, −2, −1, 0, 1, 2, 3, 4, 5, 6 and 7, respectively, the above values each being outputted as the secondary partial remainder in a two's complement representation.

17. The divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using six bits at ones place and to the right thereof of the primary partial remainder;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;

quotient digit selecting means for generating a value 1 as a first quotient digit on an initial stage of a division, and thereafter selecting a second quotient digit from −7, −6, −5, −4, −3, −2, −1, 0, 1, 2, 3, 4, 5, 6 and 7 in accordance with a combination of the partial remainder interval and the divisor interval;

divisor's multiple generating means for generating a first product of the second quotient digit and the normalized divisor;

multiplication means for generating a second product equal to an octuple of the primary partial remainder in a redundant binary representation; and subsequent partial remainder generating means for subtracting the normalized divisor from a normalized dividend and outputting the subtraction result as an initial partial remainder in the redundant binary representation on the initial stage of the division, and thereafter subtracting the first product from the second product and outputting the subtraction result as a secondary partial remainder in the redundant binary representation.

18. A divider unit of claim 17, wherein the normalized divisor and the normalized dividend are both in the range of ½ at the minimum but less than 1.

19. A divider unit of claim 17, wherein the normalized divisor and the normalized dividend are both in the range of 1 at the minimum but leas than 2.

20. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using six bits at ones place and to the right thereof of the primary partial remainder;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;

quotient digit selecting means for generating a value 1 as a first quotient digit on an initial stage of a division, and thereafter selecting a second quotient digit from −7, −6, −5, −4, −3, −2, −1, 0, 1, 2, 3, 4, 5, 6 and 7 in accordance with a combination of the partial remainder interval and the divisor interval;

divisor's multiple generating means for generating a first product of the absolute value of the second quotient digit and the normalized divisor;

multiplication means for generating a second product equal to an octuple of the primary partial remainder in a redundant binary representation; and subsequent partial remainder generating means for subtracting the normalized divisor from a normalized dividend and outputting the subtraction result as an initial partial remainder in the redundant binary representation on the initial stage of the division, and thereafter subtracting the first product from the second product when the second quotient digit is positive and adding the first product and the second product when the second quotient digit is negative, the subtraction and addition results being outputted as a secondary partial remainder in the redundant binary representation.

21. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using six bits at ones place and to the right thereof of the primary partial remainder;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;

quotient digit selecting means for generating a value 1 as a first quotient digit on an initial stage of a division, and thereafter selecting a second quotient digit from −7, −6, −5, −4, −3, −2, −1, 0, 1, 2, 3, 4, 5, 6 and 7 in accordance with a combination of the partial remainder interval and the divisor interval;

divisor's multiple generating means for generating multiples of the normalized divisor with multipliers 2 through 7 on the initial stage of the division;

divisor's multiple selecting means for generating a first product of the absolute value of the quotient digit and the normalized divisor by selecting one of a value 0, the normalized divisor and the above multiples in accordance with the absolute value of the second quotient digit;

multiplication means for generating a second product equal to an octuple of the primary partial remainder in a redundant binary representation; and subsequent partial remainder generating means for subtracting the normalized divisor from a normalized dividend and outputting the subtraction result as an initial partial remainder in the redundant binary representation on the initial stage of the division, and thereafter subtracting the first product from the second product when the second quotient digit is positive and adding the first product and the second product when the second quotient digit is negative, the subtraction and addition results being outputted as a secondary partial remainder in the redundant binary representation.

22. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder, the primary partial remainder being expressed by R;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor, the normalized divisor being expressed by D;

quotient digit selecting means for generating a value 1 as a first quotient digit on an initial stage of a division, and thereafter selecting a second quotient digit from −7, −6, −5, −4, −3, −2, −1, 0, 1, 2, 3, 4, 5, 6 and 7 in accordance with a combination of the partial remainder interval and the divisor interval;

divisor's double generating means for generating the double of the normalized divisor 2D;

divisor's quadruple generating means for generating the quadruple of the normalized divisor 4D;

divisor's octuple generating means for generating the octuple of the normalized divisor 8D; and adding and subtracting means having three inputs for generating a secondary partial remainder, said adding and subtracting means subtracting the normalized divisor from a normalized dividend and outputting the subtraction result as an initial partial remainder in a redundant binary representation on the initial stage of the division, and thereafter outputting values obtained by R−D+8D, R+2D+4D, R+D+4D, R+4D, R−D+4D, R+2D, R+D, R, R−D, R−2D, R+D−4D, R−4D, R−D−4D, R−2D−4D, and R+D−8D when the second quotient digit is −7, −6, −5, −4, −3, −2, −1, 0, 1, 2, 3, 4, 5, 6 and 7, respectively, the above values each being outputted as the secondary partial remainder in the redundant binary representation.

23. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using six bits at ones place and to the right thereof of the primary partial remainder;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;

quotient digit selecting means for generating a quotient digit from −7, −6, −5, −4, −3, −2, −1, 0, 1, 2, 3, 4, 5, 6 and 7 in accordance with a combination of the partial remainder interval and the divisor interval;

divisor's multiple generating means for generating a first product of the absolute value of the quotient digit and the normalized divisor;

multiplication means for generating a second product equal to an octuple of the primary partial remainder in a redundant binary representation; and subsequent partial remainder generating means for outputting a dividend as an initial partial remainder when the absolute value of the dividend is smaller than the normalized divisor on the initial stage of the division, and thereafter subtracting the first product from the second product and outputting the subtraction result as a secondary partial remainder in the redundant binary representation.

24. A divider unit of claim 23, wherein the normalized divisor is in the range of ½ at the minimum but less than 1.

25. A divider unit of claim 23, wherein the normalized divisor is in the range of 1 at the minimum but less than 2.

26. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using six bits at ones place and to the right thereof of the primary partial remainder;

divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;

quotient digit selecting means for generating a quotient digit from −7, −6, −5, −4, −3, −2, −1, 0, 1, 2, 3, 4, 5, 6 and 7 in accordance with a combination of the partial remainder interval and the divisor interval;

divisor's multiple generating means for generating a first product of the quotient digit and the normalized divisor;

multiplication means for generating a second product equal to an octuple of the primary partial remainder in a redundant binary representation; and subsequent partial remainder generating means for outputting a dividend as an initial partial remainder when the absolute value of the dividend is smaller than the normalized divisor on the initial stage of the division, and thereafter subtracting the first product from the second product when the quotient digit is positive and adding the first product and the second product when the quotient digit is negative, the subtraction and addition results being outputted as a secondary partial remainder in the redundant binary representation.

27. A divider unit for executing a radix-8 division, said unit comprising:
partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using six bits at ones place and to the right thereof of the primary partial remainder;
divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor;
quotient digit selecting means for generating a quotient digit from $-7, -6, -5, -4, -3, -2, -1, 0, 1, 2, 3, 4, 5, 6$ and $7$ in accordance with a combination of the partial remainder interval and the divisor interval;
divisor's multiple generating means for generating multiples of the normalized divisor with multipliers 2 through 7 on the initial stage of the division;
divisor's multiple selecting means for generating a first product of the absolute value of the quotient digit and the normalized divisor by selecting one of a value 0, the normalized divisor and the above multiples in accordance with the absolute value of the quotient digit;
multiplication means for generating a second product equal to an octuple of the primary partial remainder in a redundant binary representation; and
subsequent partial remainder generating means for outputting a dividend as an initial partial remainder when the absolute value of the dividend is smaller than the normalized divisor on the initial stage of the division, and thereafter subtracting the first product from the second product when the quotient digit is positive and adding the first product and the second product when the quotient digit is negative, the subtraction and addition results being outputted as a secondary partial remainder in the redundant binary representation.

28. A divider unit for executing a radix-8 division, said unit comprising:
partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using six bits at ones place and to the right of the primary partial remainder, the primary partial remainder being expressed by R;
divisor interval selecting means for selecting a divisor interval to which a normalized divisor belongs out of a plurality of intervals obtained by dividing a range of the normalized divisor using specified constants as borders, the above selection being done using five bits at a second binary place and to the right thereof of the normalized divisor, the normalized divisor being expressed by D;
quotient digit selecting means for generating a quotient digit from $-7, -6, -5, -4, -3, -2, -1, 0, 1, 2, 3, 4, 5, 6$ and $7$ in accordance with a combination of the partial remainder interval and the divisor interval;
divisor's double generating means for generating the double of the normalized divisor 2D;
divisor's quadruple generating means for generating the quadruple of the normalized divisor 4D;
divisor's octuple generating means for generating the octuple of the normalized divisor 8D; and
adding and subtracting means having three inputs for generating a secondary partial remainder, said adding and subtracting means outputting a dividend as an initial partial remainder when the absolute value of the dividend is smaller than the normalized divisor on the initial stage of the division, and thereafter outputting values obtained by $R-D+8D$, $R+2D+4D$, $R+D+4D$, $R+4D$, $R-D+4D$, $R+2D$, $R+D$, $R$, $R-D$, $R-2D$, $R+D-4D$, $R-4D$, $R-D-4D$, $R-2D-4D$, and $R+D-8D$ when the quotient digit is $-7, -6, -5, -4, -3, -2, -1, 0, 1, 2, 3, 4, 5, 6$ and $7$, respectively, the above values each being outputted as the secondary partial remainder in a redundant binary representation.

29. A divider unit of any one of claims 5 through 28, further comprising:
positive quotient digit storing means for selectively storing the absolute value of the second quotient digit expressed by three bits and a value 0 in an appropriate digit position when the second quotient digit is positive;
negative quotient digit storing means for selectively storing the absolute value of the second quotient digit expressed by three bits and a value 0 in an appropriate digit position when the second quotient digit is negative; and
quotient converting means for subtracting the value stored in said negative quotient digit storing means from the value stored in said positive quotient digit storing means, whereby to output the subtraction result as a quotient;
wherein a series of operation from selecting the partial remainder interval to outputting the secondary partial remainder is repeated n/3 times, where n is a bit length of the quotient, the figures at binary places being counted as one, whereby to obtain the quotient in the two's complement representation by said quotient converting means and to obtain a final remainder.

30. A divider unit of any one of claims 5 through 28, further comprising quotient accumulating shift register means for retaining a value 0 on the initial stage of the division and thereafter shifting the retained value in the upper direction by three bits each time the second quotient digit is obtained as well as accumulating the second quotient digit to the above shifted value.

31. A divider unit for executing a radix-8 division, said unit comprising:
partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using two bits to the right of the binary point of the primary partial remainder and a sign of the primary partial remainder;

quotient digit selecting means for generating a value 1 as a first quotient digit on an initial stage of a division, and thereafter selecting a second quotient digit from −3, −2, −1, 0, 1, 2 and 3 in accordance with a combination of the partial remainder interval and a bit at a secondary binary place of a normalized divisor;

divisor's multiple generating means for generating a first product of the second quotient digit and the normalized divisor;

multiplication means for generating a second product equal to a quadruple of the primary partial remainder in a two's complement representation; and subsequent partial remainder generating means for subtracting the normalized divisor from a normalized dividend and outputting the subtraction result as an initial partial remainder in the two's complement representation on the initial stage of the division, and thereafter subtracting the first product from the second product and outputting the subtraction result as a secondary partial remainder in the two's complement representation.

32. A divider unit of claim 31, wherein the normalized divisor and the normalized dividend are both in the range of ½ at the minimum but less than 1.

33. A divider unit of claim 31, wherein the normalized divisor and the normalized dividend are both in the range of 1 at the minimum but less than 2.

34. A divider unit for executing a radix-8 division, said unit comprising:
partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;

quotient digit selecting means for generating a value 1 as a first quotient digit on an initial stage of a division, and thereafter selecting a second quotient digit from −3, −2, −1, 0, 1, 2 and 3 in accordance with a combination of the partial remainder interval and a bit at a second binary place of a normalized divisor;

divisor's multiple generating means for generating a first product of the absolute value of the second quotient digit and the normalized divisor;

multiplication means for generating a second product equal to a quadruple of the primary partial remainder in a two's complement representation; and subsequent partial remainder generating means for subtracting the normalized divisor from a normalized dividend and outputting the subtraction result as an initial partial remainder in the two's complement representation on the initial stage of the division, and thereafter subtracting the first product from the second product when the second quotient digit is positive and adding the first product and the second product when the second quotient digit is negative, the subtraction and addition results being outputted as a secondary partial remainder in the two's complement representation.

35. A divider unit for executing a radix-8 division, said unit comprising:
partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;

quotient digit selecting means for generating a value 1 as a first quotient digit on an initial stage of a division and thereafter selecting a second quotient digit from −3, −2, −1, 0, 1, 2 and 3 in accordance with a combination of the partial remainder interval and a bit at a second binary place of a normalized divisor;

divisor's multiple generating means for generating multiples of the normalized divisor with multipliers 2 and 3 on the initial stage of the division;

divisor's multiple selecting means for generating a first product of the absolute value of the quotient digit and the normalized divisor by selecting one of a value 0, the normalized divisor and the above multiples in accordance with the absolute value of the second quotient digit;

multiplication means for generating a second product equal to a quadruple of the primary partial remainder in a two's complement representation; and subsequent partial remainder generating means for subtracting the normalized divisor from a normalized dividend and outputting the subtraction result as an initial partial remainder in the two's complement representation on the initial stage of the division, and thereafter subtracting the first product from the second product when the second quotient digit is positive and adding the first product and the second product when the second quotient digit is negative, the subtraction and addition results being outputted as a secondary partial remainder in the two's complement representation.

36. A divider unit for executing a radix-8 division, said unit comprising:
partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder, the primary partial remainder being expressed by R;

quotient digit selecting means for generating a value 1 as a first quotient digit on an initial stage of a division, and thereafter selecting a second quotient digit from −3, −2, −1, 0, 1, 2 and 3, in accordance with a combination of the partial remainder interval and a bit at a second binary place of a normalized divisor, the normalized divisor being expressed by D;

divisor's double generating means for generating the double of the normalized divisor 2D; and adding and subtracting means having three inputs for generating a secondary partial remainder, said adding and subtracting means subtracting the normalized divisor from a normalized dividend and outputting the subtraction result as an initial partial remainder in a two's complement representation on the initial stage of the division, and thereafter outputting values obtained by R+D+2D, R+2D, R+D, R, R−D, R−2D and R−D−2D when the second quotient digit is −3, −2, −1, 0, 1, 2, and 3 respectively, the above values each being outputted as the secondary partial remainder in the two's complement representation.

37. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;

quotient digit selecting means for generating a quotient digit from −3, −2, −1, 0, 1, 2 and 3 in accordance with a combination of the partial remainder interval and a bit at a second binary place of a normalized divisor;

divisor's multiple generating means for generating a first product of the quotient digit and the normalized divisor;

multiplication means for generating a second product equal to a quadruple of the primary partial remainder in a two's complement representation; and subsequent partial remainder generating means for outputting a dividend as an initial partial remainder when the absolute value of the dividend is smaller than the divisor on the initial stage of the division, and thereafter subtracting the first product from the second product and outputting the subtraction result as a secondary partial remainder in the two's complement representation.

38. A divider unit of claim 37, wherein the normalized divisor is in the range of ½ at the minimum but less than 1.

39. A divider unit of claim 37, wherein the normalized divisor is in the range of 1 at the minimum but less than 2.

40. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;

quotient digit selecting means for generating a quotient digit from −3, −2, −1, 0, 1, 2 and 3 in accordance with a combination of the partial remainder interval and a bit at a second binary place of a normalized divisor;

divisor's multiple generating means for generating a first product of the quotient digit and the normalized divisor;

multiplication means for generating a second product equal to a quadruple of the primary partial remainder in a two's complement, representation; and subsequent partial remainder generating means for outputting a dividend as an initial partial remainder when the absolute value of the dividend is smaller than the divisor on the initial stage of the division, and thereafter subtracting the first product from the second product when the quotient digit is positive and adding the first product and the second product when the quotient digit is negative, the subtraction and addition results being outputted as a secondary partial remainder in the two's complement representation.

41. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder;

quotient digit selecting means for generating a quotient digit from −3, −2, −1, 0, 1, 2 and 3, in accordance with a combination of the partial remainder interval and a bit at a second binary place of a normalized divisor;

divisor's multiple generating means for generating multiples of the normalized division with multipliers 2 and 3 on the initial stage of the division;

divisor's multiple selecting means for generating a first product of the absolute value of the quotient digit and the normalized divisor by selecting one of a value 0, the divisor and the above multiples in accordance with the absolute value of the quotient digit;

multiplication means for generating a second product equal to a quadruple of the primary partial remainder in a two's complement representation; and subsequent partial remainder generating means for outputting a dividend as an initial partial remainder when the absolute value of the dividend is smaller than the divisor on the initial stage of the division, and thereafter subtracting the first product from the second product when the quotient digit is positive and adding the first product and the second product when the quotient digit is negative, the subtraction and addition results being outputted as a secondary partial remainder in the two's complement representation.

42. A divider unit for executing a radix-8 division, said unit comprising:

partial remainder interval selecting means for selecting a partial remainder interval to which a primary partial remainder belongs out of a plurality of intervals obtained by dividing a range of values in which the primary partial remainder is obtainable, the range being divided using specified constants as borders, the above selection being done using four bits to the right of the binary point of the primary partial remainder and a sign of the primary partial remainder, the primary partial remainder being expressed by R;

quotient digit selecting means for generating a quotient digit from −3, −2, −1, 0, 1, 2 and 3 in accordance with a combination of the partial remainder interval and a bit at a second binary place of a normalized divisor, the normalized divisor being expressed by D;

divisor's multiple generating means for generating the double of the normalized divisor 2D; and adding and subtracting means having three inputs for generating a secondary partial remainder, said adding and subtracting means outputting a dividend as an initial partial remainder when the absolute value of the dividend is smaller than the normalized divisor on the initial stage of the division, and thereafter outputting values obtained by R+D+2D, R+2D, R+D, R, R−D, R−2D and R−D−2D when the quotient digit is −3, −2, −1, 0, 2, 3 and 3, respectively, the above values each being outputted as the secondary partial remainder in a two's complement representation.

43. A divider unit of any one of claims 31 through 42, further comprising:

positive quotient digit storing means for selectively storing the absolute value of the second quotient digit expressed by two bits and a value 0 in an appropriate digit position when the second quotient digit is positive;

negative quotient digit storing means for selectively storing the absolute value of the second quotient digit expressed by two bits and a value 0 in an appropriate digit position when the second quotient digit is negative; and quotient converting means for subtracting the value stored in said negative quotient digit storing means from the value stored in said positive quotient digit storing means, whereby to output the subtraction result as a quotient;

wherein a series of operation from selecting the partial remainder interval to outputting the secondary partial remainder is repeated n/2 times, where n is a bit length of the quotient, the figures at binary places being counted as one, whereby to obtain the quotient in the two's complement representation by said quotient converting means and to obtain a final remainder.

44. A divider unit of any one of claims 31 through 42, further comprising quotient accumulating shift register means for retaining a value 0 on the initial stage of the division and thereafter shifting the retained value in the upper direction by two bits each time the second quotient digit is obtained as well as accumulating the second quotient digit to the above shifted value.

45. A divider unit for executing a high radix division, comprising:

quotient digit selecting means for selecting one quotient digit out of all quotient digits obtainable under a radix value of an applied radix in accordance with:

(1) a result of a first logical operation executed to select a divisor interval to which a normalized divisor belongs out of a plurality of intervals obtained by dividing a range of the normalized divisor using specified constants as borders based on values of a part of upper digits of a divisor, and with:

(2) a result of a second logical operation executed to select a partial remainder interval to which a primary partial remainder belongs out of a plurality of intervals obtained by dividing a range of values in which the primary partial remainder is obtainable, the range being divided using specified constants as borders based on values of a part of upper digits of a primary partial remainder and a sign of the primary partial remainder; and subsequent partial remainder generating means for generating a subsequent partial remainder by executing an addition and a subtraction using a product of the one quotient digit and the normalized divisor and a product of the primary partial remainder and the radix value;

wherein the first and the second logical operations are executed so that a time delay of the second operation may be the minimum.

* * * * *